United States Patent
Kroon

(10) Patent No.: US 9,434,176 B1
(45) Date of Patent: Sep. 6, 2016

(54) VECTOR COMPENSATION FOR INOPERATIVE INK-JETS IN COMPOSITE COLORS

(71) Applicant: XEROX CORPORATION, Norwalk, CT (US)

(72) Inventor: Stephen Michael Kroon, Sherwood, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/754,272

(22) Filed: Jun. 29, 2015

(51) Int. Cl.
*B41J 2/21* (2006.01)

(52) U.S. Cl.
CPC .................. *B41J 2/2103* (2013.01)

(58) Field of Classification Search
CPC ... B41J 2/2139; B41J 2/2142; B41J 2/04508
See application file for complete search history.

(56) References Cited

U.S. PATENT DOCUMENTS

| | | | |
|---|---|---|---|
| 5,581,284 A * | 12/1996 | Hermanson | B41J 2/04505 347/40 |
| 6,565,180 B2 * | 5/2003 | Yu et al. | 347/19 |
| 6,805,419 B1 * | 10/2004 | Walmsley | 347/5 |
| 7,604,316 B2 * | 10/2009 | Terekhov et al. | B41J 2/2139 347/12 |
| 8,038,239 B2 * | 10/2011 | Walmsley et al. | 347/5 |
| 2004/0119766 A1 * | 6/2004 | Shibata et al. | B41J 2/5056 347/12 |
| 2007/0070111 A1 * | 3/2007 | Vladislav | 347/19 |
| 2012/0075370 A1 * | 3/2012 | Ramakrishnan et al. | 347/10 |
| 2012/0092409 A1 * | 4/2012 | Wu et al. | 347/19 |
| 2015/0154933 A1 * | 6/2015 | Bae et al. | G09G 3/2003 345/618 |

* cited by examiner

*Primary Examiner* — Stephen Meier
*Assistant Examiner* — John P Zimmermann
(74) *Attorney, Agent, or Firm* — Pillsbury Winthrop Shaw Pittman LLP

(57) ABSTRACT

The system and methods described maintain composite color print integrity of an inoperative ink-jet. The methods may include a computing device and a printer to obtain the print job and reconstruct a pixel bitmap. The methods may also include a sensor configured to generate output signals associated with the individual ink-jets located in the printhead to indicate inoperative ink-jets and help compensate for those ink-jets.

17 Claims, 16 Drawing Sheets

VECTOR COMPENSATION FOR INOPERATIVE INK-JETS IN COMPOSITE COLORS

FIELD OF THE DISCLOSURE

This disclosure relates to compensation mechanisms to retain printed hue and clarity in composite colors printed by ink-jet printers with one or more inoperative ink-jets.

BACKGROUND

Ink-jet printers generally include one or more print-heads. Print heads may include one or more ink-jets (e.g., nozzles, emitters, jets). Reduced ink-jet nozzle diameters may increase print quality and resolution. However, the reduced diameter may increase the likelihood ink within the ink-jet will dry or clog and may render the ink-jet inoperable. Purge cycles to free the clog may require the print head or printer to stop image-generation to clear the inoperable jet. Foreign objects, clogs, and partial or entire obstructions of the ink may render the ink-jet inoperable. Inoperative ink-jets may require re-vectoring of adjacent operative jets to compensate for the inoperative jets. But such weak, intermittent, or off-axis ink-jet rasters may inadequately compensate for the inoperative ink-jet.

Drop-on-demand technology utilizes the ink-jet to print media in commercial products (e.g., printers, plotters, and facsimile machines). An ink-jet may form and selectively eject ink drops from ink-jets to form an image on a surface (e.g., paper, accumulator drum, etc.). Print-heads may arrange and manage the ink-jets to print on an image-receiving surface. "Direct" ink-jet printers eject ink drops directly onto the print surface. "Indirect" ink-jet printers eject ink drops onto an intermediate image-receiving member such as a rotating imaging drum or belt. The intermediate image-receiving member may then transfer the image to the print surface. Print-heads and image-receiving surfaces may move relative to one other as ink-jets eject ink drops at appropriate locations or times to form an ink image on the image-receiving surface. A controller in the printer may generate electrical signals, also known as firing signals, at predetermined times to activate individual ink-jets. Ink-jets may eject a variety of liquid ink colors (e.g., cyan, magenta, yellow, and black).

SUMMARY

A system for maintaining colorimetry and hue in printed composite colors comprising: a printer configured to obtain a bitmap indicating a first color-plane and a first contone compensation for a first pixel; a sensor configured to generate output signals indicating a first inoperative color-plane; and a controller configured to control a second adjacent color-plane and contone to compensate the first inoperative color-plane and configured to compensate for at least one operative color-plane at the first pixel.

A method for maintaining colorimetry and hue in printed composite colors comprising: obtaining a bitmap indicating a first color-plane and a first contone compensation for a first pixel; generating output signals indicating a first inoperative color-plane; and controlling a second adjacent color-plane and contone to compensate the first inoperative color-plane and configured to compensate for at least one operative color-plane at the first pixel.

A method for maintaining colorimetry and hue of printed composite colors in a halftone printing process, the method comprising: obtaining a bitmap indicating a first color-plane and a first pre-halftone compensation for a first pixel; generating output signals indicating a first inoperative color-plane; and controlling a second adjacent color-plane and post-halftone to compensate the first inoperative color-plane and configured to compensate for at least one operative color-plane at the first pixel.

These and other features, and characteristics of the present technology, as well as the methods of operation and functions of the related elements of structure and the combination of parts and economies of manufacture, will become more apparent upon consideration of the following description and the claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present embodiments. As used in the specification and in the claims, the singular form of "a", "an", and "the" include plural referents unless the context clearly dictates otherwise.

DETAILED DESCRIPTION

Figure 1:
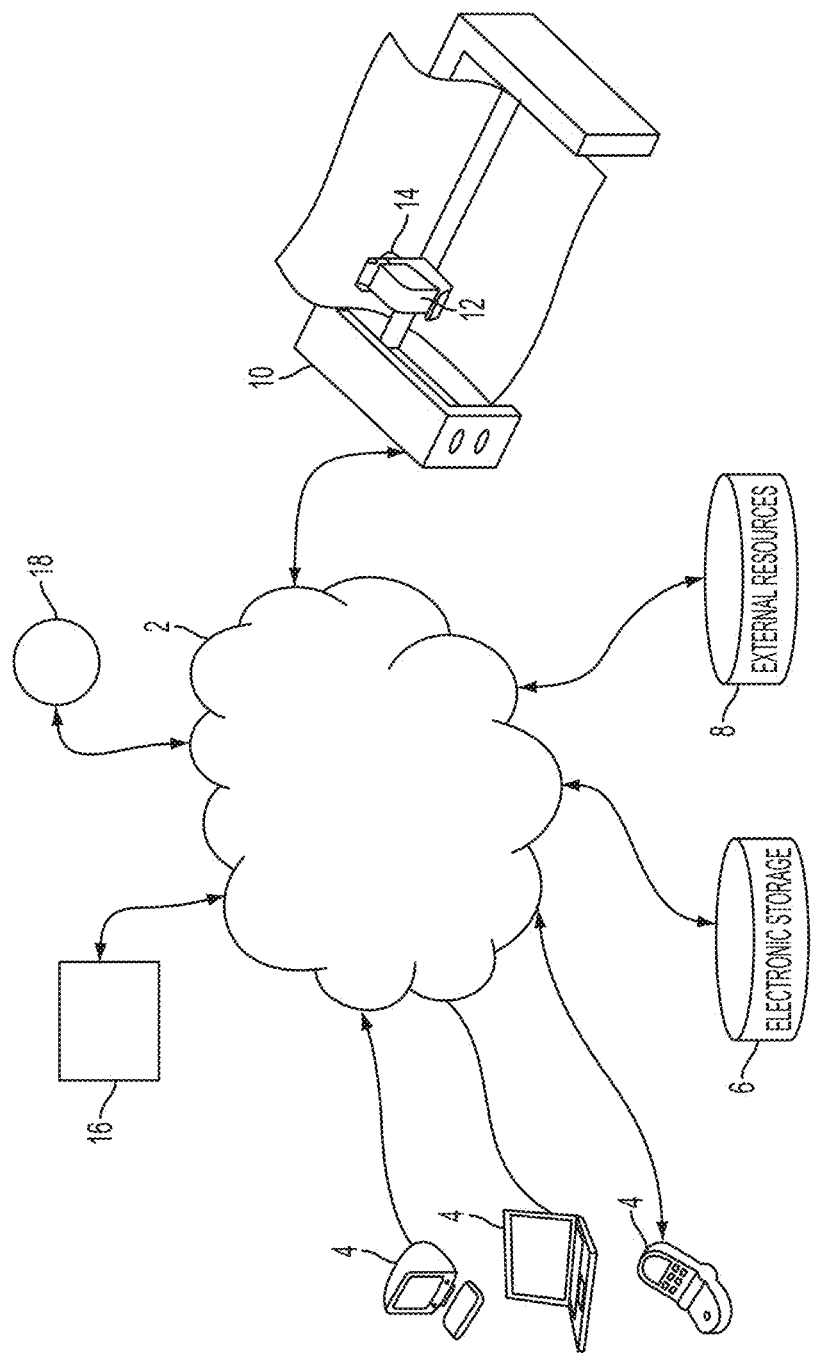
FIG. 1 is a schematic representation of the systems components demonstrating how system components may interact.

One objective of the present embodiments is to use Inoperative Jet Compensation (IJC) in an ink-jet printer to modify image content prior to printing. Specifically, inoperative ink-jets may disproportionally impact composite colors. IJC may pre-compensate for one or more inoperative color-planes in a raster column of an array swath. IJC may compensate a missing raster and continue full speed printing despite inoperative ink-jet(s). As used herein, "full speed printing" means printing at the speed optimally expected by the particular ink-jet printer. The present embodiments can be used with different ink jet printers and may operate at the optimal speed ranges for any such printer as readily known by one skilled in the art. IJC may apply post-render independent of a missing raster in an output color-plane. The process may be scalar (e.g., missing raster color compensation rather than vector compensation in multiple primary color-planes). Maximum correctable density may limit primary color dot spread and available primary color-planes near missing-rasters. Colorimetric accuracy of composite colors (e.g., colors generated from multiple color-planes), especially near theoretic limits, may contribute to a predetermined maximum correctable density. In some embodiments, the absence of color may contribute to colorimetric accuracy.

As used herein, "IJC" refers to a process of applying color to an adjacent raster column to compensate for a missing raster color plane. IJC may apply to operative color-planes. In some embodiments, IJC applies to missing rasters or operative rasters. As used herein, "modified IJC" specifically applies the IJC process to an operative raster column or color-plane. Vector IJC applies to more than one color-plane. Scalar IJC applies only to the inoperative color-plane.

Composite colors may require two or more times additional ink. Therefore, dot spread should provide greater maximum correctable density compared to primary colors. Maximum correctable composite color levels may exceed primary maximums but not to the extent expected. For example, uncontrolled hue shifts and texture artifacts may lower the expected maximum correctable composite color density. High fractional coverage of IJC corrected colors may enhance these artifacts. Unless some form of per-raster color adjustment is available, scalar binary IJC must reconcile color differences between IJC processed and unprocessed rasters. Binary IJC mechanisms may match density including jet-overlap compensation. However, scalar IJC may not correct significant hue differences (e.g., hue differences that are uncorrectable with simple Tone Reduction Curve (TRC) adjustment).

In low space frequencies vectors may vary based on total ink to compensate for missing gaps. For example, primary or composite (e.g., secondary, tertiary, and super-composite black) colors may easily compensate for a missing raster. However, maximum correctable levels in composite (e.g., secondary) colors may actually lower the maximum correctable composite color levels in primary colors. The present disclosure may avoid gratuitous modification of low special frequencies and compensate for the imbalance problems associated with these lowered maximum correctable composite color levels within the primary colors.

IJC may reduce hue shifts and composite color artifacts in compensated composite colors without per-raster vector color correction. Particularly for low frequency colors modified IJC may compensate composite color maxima. Per-raster IJC density match for primary colors may provide sufficient correction. However, treating as inoperative corresponding operative rasters in other or all color-planes when one color plane is inoperative may reduce hue shifts and composite color artifacts. In other words, missed ink in a pixel location for one or more color-planes may result in treating corresponding pixels in other color-planes as inoperative (e.g., both operative and inoperative color-planes). The modified IJC may reduce hue shifts or other artifacts. Normalized dot profiles (e.g., of constituent primary colors) may better preserve both the integrated relative color contribution and color density.

Advantages of this approach include depopulating the missing-raster gap and allowing it to close with neighboring dot spread. This may reduce hue shifts without vector raster color correction and increase maximum correctable colorimetry levels. IJC primary color processing normalizes dot-profiles and reduces hue shift without raster specific vector color correction. Relocating ink from composite color pixels (e.g., where one or more ink is missing) may allow neighboring ink to spread into and fill missing raster gaps more uniformly and completely. This limits deviation from the intended color. As a result, the modified IJC process may achieve higher correctable levels and more frequent full-speed printing. Moreover when the modified method is combined with a dither-back process, dither-back levels may increase and thereby increase the printable color gamut.

As used herein, a "printer" is any apparatus that forms an image on media for any purpose, such as a digital copier, bookmaking machine, facsimile machine, multi-function machine, or the like. As used herein, a printer includes a print-head that includes one or more ink-jets. A "swath" is a typically adjacent group of raster columns as marked onto an image-receiving member.

As used herein, the words "jets" and "ink-jets" are interchangeable to identify a component that applies marking material to a surface to form a portion of an image corresponding to image data. As used herein, the term "inoperative ink-jet" refers to a malfunctioning ink-jet in a printer that does not eject ink, ejects ink only on an intermittent basis, or ejects ink onto an incorrect location of an image-receiving member when the ink-jet receives an electrical firing signal. A typical ink-jet printer includes a plurality of ink-jets in one or more print-heads. Each ink-jet is responsible for marking one or more output raster columns onto an image-receiving member. Raster columns printed by operational ink-jets located near each raster column missing due to an inoperative ink-jet may compensate for the missing column to preserve image quality.

As used herein, the term "pixel" refers to the smallest addressable element within an image. The precise definition is context dependent. Unless expressly stated otherwise, a pixel in this disclosure refers to the smallest addressable element within a printed image. An "activated pixel" refers to a pixel in the printed image data wherein the printer ejects a drop of ink onto an image-receiving surface location. A "deactivated pixel" refers to a pixel in the image data having a value where the printer does not eject a drop of ink onto an image-receiving surface location. The term "pixel column" refers to an arrangement of pixels in image data that extend in the process direction (see, e.g., raster column below). Since the image-receiving surface moves past the inkjets in a print zone in the process direction, if an inkjet is inoperative, then the inkjet cannot eject the ink drops corresponding to activated pixels in a pixel column that is aligned with the inoperative inkjet in the print zone. As described below, the printer activates additional pixels in the same color plane in the image data that are proximate to activated pixels in a pixel column that is aligned with the inoperative inkjet in the cross-process direction to reduce or eliminate defects in printed images formed with the inoperative inkjet.

As used herein the terms "binary image data" or "bitmap" refer to image data formed as a two-dimensional (or three dimensional) arrangement of activated or deactivated pixels. Bitmap may refer to an array of continuous tone data including multi-plane color data. For example, each pixel of the bitmap (e.g., binary image data) may include one of two values indicating whether to activate or deactivate the pixel.

Some ink-jet devices may print one or two drops of each primary color at a pixel location. This configuration may give three states per pixel. In some embodiments ink-jet devices may print big and little drops of the same color at each pixel location (also three state pixels) or little or big (giving four states per pixel). For example, one bit per pixel may encode two states: 0, 1. Two bits per pixel may encode three states: 00, 01, 10. Four states per pixel may encode four states: 00, 01, 10, 11. Other native behaviors are possible. For example an ink-jet printer may print big and small drops. In some embodiments, big drops may not immediately follow small drops in the bitmap. An ink-jet printer may selectively eject ink drops corresponding to the activated pixels in the image data to form ink images.

As used herein a "raster" or "raster column" is an output resolution single pixel wide column corresponding to a single color plane of the image so that, assuming four output colors planes and the terminology of this disclosure, a single pixel wide vertical frame buffer column would consist of four rasters; one corresponding to each of four output color-planes. As used herein rasters extends in the process direction. This differs from common usage where rasters are row aligned in the fast scan direction. As used herein a "missing raster" is a raster that will not print because the jet responsible for printing it is inoperative.

The phrase "orphaned ink" or the term "orphan" refers to ink drops or activated pixels that will not print because they are in missing rasters. The "missing-raster gap" or "gap" is the output column corresponding to a missing raster.

As used herein, the term "image density" may correspond to a number of activated pixels in image data or ink drops in an ink image. In a high-density region, a comparatively large portion of the pixels are activated and the corresponding region of the image-receiving surface receives a correspondingly large number of ink drops. In a low-density region, fewer pixels are activated and the corresponding region of the image-receiving surface receives fewer ink drops. It may also indicate perceived color saturation levels independent of constituent activated pixel or ink drop counts.

As used herein, a "swath" is a group of typically adjacent working rasters within a color plane including at most one centrally positioned missing raster requiring compensation. In addition to the missing raster, sometimes called the target, an N-raster swath will include at least N−1 working rasters. Each missing raster is a member of one and only one swath but as used herein, working rasters within a missing raster swath may belong to multiple overlapping missing raster swaths. If a missing raster other than the target is encountered within the swath area the non-target missing raster is skipped and the next adjacent column is included in the swath instead, widening the swath by one raster for each interstitial missing raster encountered. This ensures a minimum ratio of working to total rasters in each swath.

As used herein "render" can refer to the process that transforms received printer independent input image and page description language data to printer output resolution continuous tone image data. Rendering may be combined with or followed by a halftoning process that further transforms continuous tone rendered image data to output device color depth and resolution.

Within this application, "or" is inclusive. That is, unless clearly stated otherwise, A or B means possibilities include: A, B, or A and B. Within the specification, abstract, and claims, "or" includes all possible combinations of the listed elements. When intended, exclusive "or" is clearly indicated (e.g., "xor").

Digital color printers are typically bi-level: each output color in each output pixel location can either place (deposit, expose, activate, remove, etc.) a minimum unit of colorant or leave the pixel location blank. One bit may represent per-pixel and per-colorant. For example, the printer may use four primary colors: cyan, magenta, yellow and black (CMYK) and may implement the same resolution and bit depth in the four color-planes. In this simple configuration (e.g., without contone/halftone) only four bits are required per pixel to represent all sixteen possible per-pixel color combinations. Output pixel information for the page, sometimes called a frame buffer, is commonly structured as four one bit per pixel output frame resolution (binary) bitmaps or output color-planes.

A multicolor printer ejects ink drops of different ink color with reference to binary image data for each of the different colors to form multicolor ink images. In this embodiment, a multicolor printer examines the bitmap data to determine the pixels color. The colors available to the multicolor printer represent primary output colors or "color-planes." Typically coincident color-planes of corresponding ink-jets made geometrically and mechanically similar to one another to minimize image quality variations. The order the primary colors are output may yield image quality variations. For example, printing the primary color cyan first then magenta may yield a different composite color than printing magenta first then cyan. Image quality variations occur instrument-to-instrument and over the product life of a single instrument. Ink-jets that track together minimize hue imbalance and related artifacts. Digital printers may include four output color-planes. As described in this application, these primary color-planes include Cyan, Magenta, Yellow, or Black (CMYK). In some embodiments five, six, or more primary color-planes may be used.

Two dimensional arrays may arrange image data, both continuous tone and binary. Image data may include dimensions corresponding to the process direction and cross-process direction. The "scan direction" or "cross-process direction" is perpendicular to the direction the image-receiving surface moves through the printer. The "process direction" is parallel to the direction the image-receiving surface moves. As used herein, the term "pixel column" refers to an arrangement of pixels in image data that extend in the process direction. Since the image-receiving surface moves past the ink-jets in a print zone in the process direction, if an ink-jet is inoperative, then the ink-jet cannot eject ink drops corresponding to activated pixels in a pixel column aligned with the inoperative ink-jet. As described below, the printer may activate additional pixels in the same color-plane in the image data adjacent to activated pixels in a raster column. The additional pixels may align with the inoperative ink-jet in the cross-process direction to reduce or eliminate defects in printed images formed with the inoperative ink-jet.

As used herein, the term "image density" may correspond to a number of activated pixels in image data, a bitmap, or ink drops within an ink image. High-density regions activate a comparatively large portion of the pixels. The corresponding high density regions of the image-receiving surface may receive a correspondingly large number of ink drops. A low-density region activates fewer pixels and the corresponding low-density region of the image-receiving surface may receive fewer ink drops. Image density may indicate perceived color saturation levels independent of constituent activated pixel or ink drop counts.

FIG. 1 is a schematic representation of the systems components demonstrating how system components may interact. Printer 10 may connect to a network 2 wherein the network includes one or more computing devices 4, electronic storage 6, external resources 8, controller 16, sensor 18, or other network components. Printer 10 may include a print head 12. Print head 12 may include one or more ink-jets 14 corresponding to each raster column.

Figure 2:
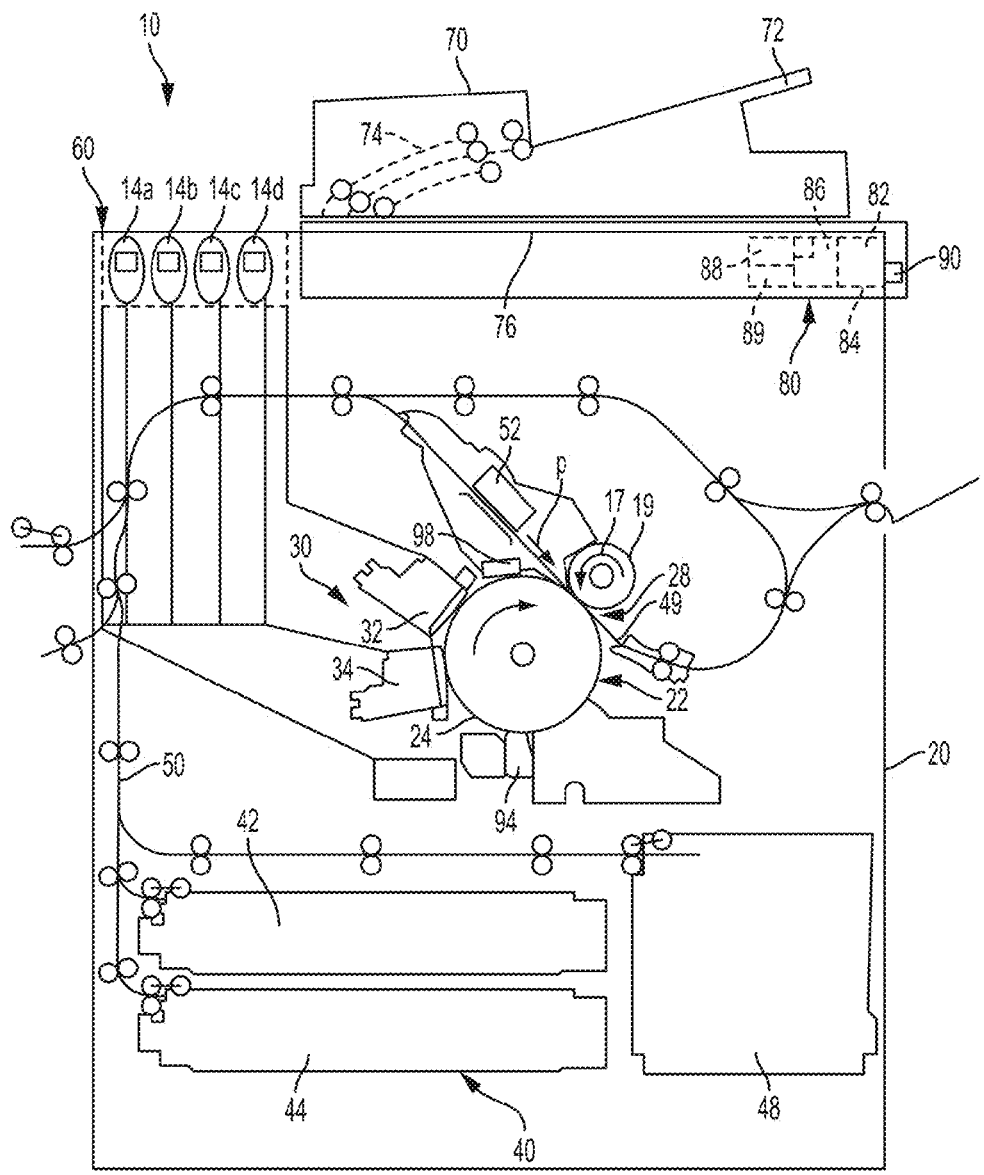
FIG. 2 diagrams one embodiment of a printer configured to compensate for one or more inoperative ink-jets.
Figure 3:
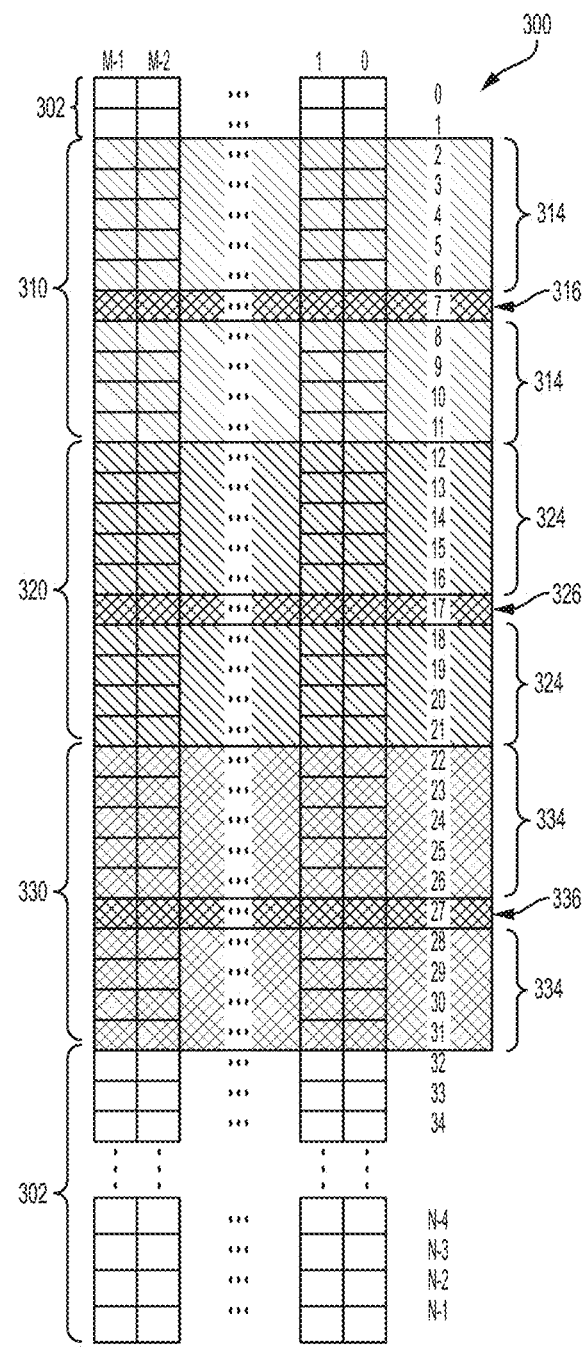
FIG. 3 represents one embodiment including four N-column by M-row output resolution color-planes, which together comprise a printer frame buffer or color bitmap.

FIG. 2 diagrams one embodiment of printer 10 configured to compensate for one or more inoperative ink-jets 14a (shown in FIG. 1 and described in FIG. 3). Printer 10 may IJC compensate one or more ink-jets 14 (e.g., applied to a color plane of either an operative jet 14b or inoperative jet 14a). Bi-level digital color printers may include a given output color in a given output pixel location and may place (e.g., deposit, expose, activate, remove, etc.) a minimum unit of colorant. Alternatively, printer 10 may leave the pixel location blank. One bit per-pixel per-colorant may define this process. An exemplary embodiment of a raster on a printer-head 12 (as shown in FIG. 1) may print one raster 316 column. For example a raster 316 may use four ink-jets 14 with primary colors such as cyan 14a, magenta 14b, yellow 14c, and black 14d (CMYK). The four color-planes may have the same resolution and bit depth. In this configuration the raster 316 width (e.g. pixel width) is the distance between cyan 14a and yellow 14c and the pixel height is the distance between magenta 14a and black 15d; although other configurations are possible. For example, the four color-planes may have variable resolution or bit depth, creating contones and halftones.

Four (or five) bits per pixel may represent all sixteen possible per-pixel color combinations. In some embodiments, a fifth or additional bit may indicate an activated or deactivated pixel. Four one bit per pixel output frame resolution (binary) bitmaps or output color-planes may structure output pixel information for the page, sometimes called the frame buffer. For example, four bits encode printing yellow (0010) based on the CMYK raster bitmap configuration. In a second configuration using five bits to convey this information, the first (or last —or any configured bit) may indicate whether the printer should print, (e.g., 10010 prints yellow, 00010 does not print). As will become clear, the second configuration may benefit IJC encoding to prevent printing of operative ink-jets 14b. This example is not limiting, other configurations are possible, such as a 6 ink-jet 14 raster 316 comprising six, or seven, bit encoding.

Pixels in different color-planes within a frame buffer align or correspond when their values determine the output color for the same pixel location on the image-receiving surface. Rasters 316 align, or correspond, if all of their constituent pixels align. Swaths (e.g., collections of rasters 316) may represent different output colors that align or correspond if all included rasters 316 align.

Inoperative Jet Compensation (IJC) may inclusively implement pre or post halftoning stages. IJC may exclusively use a post-halftone process on the rasterized frame buffer. IJC may implement a scalar process. In the scalar process, IJC may only modify data within the missing raster color-plane. Additional modified IJC may correspond to pixel data in other color-planes representing any or all operative output ink colors aligned with a missing raster swath. In some embodiments, controller 16 may determine implementation specific conditions to best apply modified IJC processing (e.g., IJC processing to additional or adjacent ink-jet 14 color-planes 14a-d). The controller may control the printer 10, print mode, or ink-jet 14 color-planes 14a-d. A mode of the current disclosure may include a check for implementation specific conditions prior to applying vector IJC processing (e.g., the modified IJC described including applying modified IJC to operative ink-jet 14 color-planes 14a-d). For example, additional processing may only apply to specific color-planes 14a-d, operable 14b, or inoperable 14a. (N.B. this disclosure provides an exemplary embodiment, unless stated otherwise, that assumes magenta 14a is inoperable 14a and cyan 14b is operable 14b. In practice, any color plane 14a-d may become "inoperable" or may be "operable").

In the current disclosure, IJC density conservation may eliminate a need to re-render a page (e.g., if modified IJC is unsuccessful). IJC may allow accurate contribution to working rasters 316 color-planes 14 processed as missing or inoperable. Modified IJC may retain intended image density, even in excess of the maximum IJC correctable density, with no additional processing costs.

Modified IJC may not alter image content. For example, image content and image data may not alter the modified IJC process. Modified IJC may include useful instances for applying equivalent missing jet 14 processing to swaths 302 in all color-planes 14 aligned with each missing raster 316 swath 310. The process may apply IJC to a subset of jets 14 (operative 14b and inoperative 14a). For example, the process may align working swaths according to pre-determined image independent criteria such as, "yellow 14c only" or "all color-planes but black 14d" or may use a less aggressive IJC algorithm to process working rasters 316. This may provide the advantage of avoiding image data dependent conditional behavior or avoid requirements for cross color-plane 14 output resolution data access. Cross color-plane 14 output resolution data may not be available in some image pipeline architectures.

Conditional restraint may prevent systematic application of IJC processing to working swaths 302 based on image data content. For example, processing may prevent disadvantageous systemic application of IJC. Moreover, processing a working gray 14 raster 316 of swath as missing may present some advantages when the corresponding cyan 14a jet 14 is inoperative. If that part of the image does not use cyan 14a, activating IJC may distort the image quality or hue.

Description of Printer

FIG. 2 depicts a phase change ink printer 10 embodiment. Phase change printers 10 may compensate for one or more inoperative 14a ink-jets 14 according to an aspect of the present disclosure. Other printer 10 configurations are contemplated. Printer 10 may include frame 20 mounted directly or indirectly. Printer 10 may include an image-receiving member 22. FIG. 2 illustrates member 22 as a rotatable imaging drum, but a supported endless belt may form member 22. The image receiving member 22 (e.g., drum or belt) may have an image-receiving surface 24. Surface 24 may provide a location for formation of ink images. Actuator 94 (e.g., a servo or electric motor) may engage image-receiving member 22. Actuator 94 may rotate the image-receiving member 22 (e.g., in direction 26). As transfix roller 19 rotates in direction 17, it loads against surface 24 of drum 22 to form a transfix nip 28. The transfix nip may transfer the ink images formed on the surface 24 onto a heated print medium 49.

The phase change ink printer 10 may include a phase change ink delivery subsystem 20. Subsystem 20 may have multiple sources of different color phase change inks in solid form. Since printer 10 is a multicolor printer, the ink delivery subsystem 60 may include four (4) sources 14a, 14b, 14c, and 14d. The four sources may represent four (4) different colors CMYK (cyan 14a, magenta 14b, yellow 14c, and black 14d) of phase change inks. The phase change ink delivery subsystem may include a melting and control apparatus 98. Apparatus 98 may melt or phase change the solid form of the phase change ink (e.g., into a liquid form). In some embodiments, apparatus 98 may include UV light that melts solid or liquid UV sensitive ink. UV light may thermally set the UV sensitive ink. Each of the ink sources 14a, 14b, 14c, and 14d may include a reservoir used to supply the melted ink to the print-head assemblies 32 and 34. In FIG. 2, both of the print-head assemblies 32 and 34 receive the melted CMYK ink from the ink sources 14a-d. In some embodiments, the print-head assemblies 32 and 34 are each configured to print a subset of the CMYK ink colors.

The phase change ink printer 10 may include a substrate supply and handling subsystem 40. The substrate supply and handling subsystem 40, for example, may include sheet or substrate supply sources 42, 44, 48, of which supply source 48, for example, is a high capacity paper supply or feeder for storing and supplying image-receiving substrates in the form of a cut sheet print medium 49. The phase change ink printer 10, as shown, includes an original document feeder 70 that has a document holding tray 72, document sheet feeding and retrieval devices 74, and a document exposure and scanning subsystem 76. A media transport path 50 extracts print media, such as individually cut media sheets, from the substrate supply and handling system 40 and moves the print media in a process direction. The media transport path 50 passes the print medium 49 through a substrate heater or pre-heater assembly 52, which heats the print medium 49 prior to transfixing an ink image to the print medium 49 in the transfix nip 18.

Media sources 42, 44, 48 provide image-receiving substrates that pass through media transport path 50 to arrive at transfix nip 18 formed between the image-receiving member 22 and transfix roller 19 in timed registration with the ink image formed on the image-receiving surface 24. As the ink image and media travel through the nip, the ink image is transferred from the surface 24 and fixedly fused to the print medium 49 within the transfix nip 18. In a duplexed configuration, the media transport path 50 passes the print medium 49 through the transfix nip 18 a second time for transfixing of a second ink image to a second side of the print medium 49.

Controller 16 (shown in FIG. 1) or electronic subsystem (ESS) 80 may perform operation or control of various subsystems, components, or functions of printer 10. A dedicated mini-computer, controller 16 or ESS 80 may have a central processor unit (CPU) 82 with a digital memory 84, or a display or user interface (UI) 86. The ESS 80 or controller 16 may include a sensor 18, input and control circuit(s) 88, an ink drop placement circuit, or control circuit 89. The ink drop placement control circuit 89 may implement a field programmable gate array (FPGA). CPU 82 may read, capture, prepare, or manage image data flows associated with print jobs received from image input sources. For example, the scanning subsystem 76, or an online or a computing platform 4 (shown in FIG. 1) may transmit to CPU 82 through connection 90. As such, the ESS 80 or controller 16 may provide the main multi-tasking or processing for operating and controlling all of the other printer subsystems and functions. Servers, network 2, computing devices 4, printer 10, or other hardware may comprise the ESS center 80.

Controller 16 may implement general or specialized programmable processors 80 that execute programmed instructions, for example, print-head operation. Memory 84 or storage 6 may store the instructions or data required to perform the programmed functions associated with the processors or controllers 16. Processors 16, memory 6, or interface circuitry (e.g., network 2) may configure printer 10 to form ink images. More particularly, controllers 16 may control ink-jet 14 operation compensation for inoperative ink-jets 14*b* (see generally FIG. 1). Controller 16 may comprise a printed circuit card or a circuit in an application specific integrated circuit (ASIC). Each circuit may implement a separate processor. Alternatively, multiple circuits may implement the same processor. Discrete components may implement circuits provided in very large-scale integration (VLSI). A combination of processors, FPGAs, ASICs, or discrete components may implement any of the circuits described herein.

A general-purpose processor, a digital signal processor (DSP), an application specific integrated circuit (ASIC), a field programmable gate array (FPGA) or other programmable logic device, discrete gate or transistor logic, discrete hardware components, or any combination thereof, may perform the functions of controller 16 described herein. Controller 16 may comprise a microprocessor, general-purpose processor, or other processors or state machine. The processor may implement a combination of computing devices 4. For example, the processor may implement a DSP and microprocessor combination, a plurality of microprocessors, one or more microprocessors in conjunction with a DSP core, or any other such configuration.

Hardware may embody the method or algorithm steps described below in connection with the disclosure. A processor may execute software modules. A combination of software and hardware may embody the method steps. Software modules may reside in RAM memory, flash memory, ROM memory, EPROM memory, EEPROM memory, registers, hard disk, a removable disk, a CD-ROM, or any other form of storage medium known in the art (e.g., electronic storage 6). Electronic storage 6 medium may couple to the processor, such that the processor can read information from and write information to the electronic storage 6 medium. Storage 6 medium may integrate the processor. The processor and storage medium 6 may reside in an ASIC. The ASIC may reside in a user terminal (e.g., computing devices 4). In the alternative, the processor and storage 6 medium may reside as discrete components in a user terminal. Moreover, any of the aforementioned components may be self-contained or individually distributed within printer 10, computing device 4, a server, or otherwise connected to network 2.

In some embodiments, hardware, software, firmware, or any combination thereof may implement the described features. Functions implemented in software may store or transmit one or more instructions (e.g., code) to a computer-readable storage medium 6. Computer-readable media 6 include both computer storage media 6 and communication media. Specifically, media may include any medium that facilitates transfer of a computer program from one place to another. Electronic storage media 6 may include any available media accessible to a general purpose or special purpose computer. By way of example, and not limitation, such computer-readable media may comprise RAM, ROM, EEPROM, CD-ROM, other optical disk storage, magnetic disk storage, other magnetic storage devices, or any other medium used to carry or store desired program code. Electronic storage 6 may store program code as instructions or data structures.

A general-purpose or special-purpose computer may access storage 6. Alternatively, a general-purpose or special-purpose processor may access storage 6. Accessing storage 6 may include any combination of these methods. For example, several media exist to transmit software (e.g., from a website, server, or other remote source). Coaxial cable, fiber optic cable, twisted pair, digital subscriber line (DSL), wireless technologies may transmit software. Other methods may include infrared, radio, or microwave or other wireless technologies. Disc (or disk) media include compact disc (CD), laser disc, optical disc, digital versatile disc (DVD), floppy disk, and blu-ray disc. As used herein, disks may reproduce data magnetically, while discs may reproduce data optically (e.g., with lasers). The scope of this disclosure includes combinations of computer-readable media listed above.

Printer 10 may eject a plurality of ink drops from ink-jets 14 onto surface 24 of the image-receiving member 22. Controller 80 may generate electrical firing signals (e.g., 0001) to operate individual ink-jets 14 (e.g., black 14*d*). Controller 80 may generate electrical firing signals in one or more print-head 32, 34 assemblies. In a multi-color printer 10, controller 80 may process digital image data corresponding to one or more printed pages in a print job. Controller 80 may generate two-dimensional bitmaps for each color-plane of ink in the image, such as the CMYK colors.

In some embodiments, controller 80 may repeat the process to create halftones or contones. This may result in multiple or stacked layers at a specific raster location. This process may extend to three dimensional print jobs. Each bitmap may include a two dimensional (or 3D) arrangement of pixels corresponding to locations on image-receiving member 22. In some embodiments, binary signals may indicate an activated or deactivated pixel. Controller 80 generates a firing signal to activate an ink-jet and eject a drop of ink onto the image-receiving member 22 for the activated pixels, but does not generate a firing signal for the deactivated pixels, regardless of what color they may indicate. Combined or layered bitmaps for each ink color in printer 10 may generate multicolor or monochrome images that are subsequently transfixed to the print medium 49. Controller 80 may generate the bitmaps with selected activated pixel locations and with 8, 16, or 32 bit encoding may enable printer 10 to produce multi-color images, half-toned images, dithered images, and the like.

During a printing operation, one or more of the ink-jets in the print-head assemblies 32 and 34 may become inoperative. An inoperative ink-jet may eject ink drops on an intermittent basis, eject ink drops onto an incorrect location on the image-receiving surface 24, or entirely fail to eject ink drops. In some embodiments, inoperative jets may include weak, missing, or off axis jets. Inoperative jets may include compensated operative jets. Printer 10 may utilize an optical sensor 98 to generate image data corresponding to printed ink drops on image-receiving surface 24. Optical sensor 98 may generate data after formation of the ink images and prior to the imaging drum 12 rotating through the nip 18 to transfix the ink images. In one embodiment, optical sensor 98 may include a linear array of individual optical detectors 98. The array of detectors 98 may detect light reflected from the image-receiving surface 24.

Individual optical detectors 98 may detect an area of the image-receiving member 22 corresponding to one pixel on surface 24 of the image-receiving member 22 in a cross-process direction. The cross-process direction is perpendicular to the process direction. Optical sensor 98 may generate digital data, referred to as reflectance data, corresponding to the light reflected from the image-receiving surface 24. Controller 80 may identify inoperative 14*a* ink-jets 14 in print-head assemblies 32 and 34. For example, controller 80 may reference the reflectance values detected on the imaging receiving surface 24 and the predetermined image data of the printed ink images. In an alternative embodiment, optical sensor 98 may detect defects in ink images after the ink images form on print medium 49. In some embodiments, sensors 18 may identify inoperative ink-jets 14*a* located in the print-head assemblies. In response to identifying an inoperative ink-jet, controller 80 may cease generation of firing signals for the inoperative 14*a* ink-jet 14. For example using 5-bit encoding, controller 16 may change the first bit to 0 and turn off the firing signal to ink-jet 14. Controller 16 may generate or modify firing signals for adjacent ink-jets 14 proximate to inoperative 14*a* ink-jet 14. In this way, printer 10 may compensate for the inoperative 14*a* ink-jet 14.

Printer 10 may compensate for inoperative 14*a* ink-jets 14 using the processes described herein. But the processes may compensate for inoperative 14*a* ink-jets 14 in alternative ink-jet 14 configurations. For example, printer 10 in FIG. 2 may eject drops of a phase changing ink. Alternative printer configurations may include different ink types: aqueous ink, solvent based ink, UV curable ink, solid ink, and the like. These and similar inks may use the processes described herein. FIG. 2 shows printer 10 as an indirect printer, but printers that eject ink drops directly onto a print medium (e.g., direct printers 10) may operate using the processes described herein.

Returning to FIG. 1, an important part of the process involves controller 16 detecting an inoperative 14*b* ink-jet 14 in a print-head 12. In an embodiment of the disclosure, the detection can be implemented with controller 16 operating print-head(s) 12, 32, or 34 to print a test pattern that a user can observe to detect the missing 14*a* or inoperative 14*a* ink-jet 14. The user then manipulates the user interface of computing device 4 to enter data that identifies missing 14*a* or inoperative 14*a* ink-jet 14. Controller 16 may store this data in memory 6 for later access. The test pattern may alternatively pass an optical sensor 98 or other sensor 18 that directs light towards a test pattern and captures the electrical signals generated by optical detectors 98 (or sensors generally 18). Optical sensors 98 response may record the reflected light received by the optical detectors 98. Controller 16 may execute programmed instructions stored in memory 6 to analyze the image data and detect missing 14*a* or inoperative 14*a* ink-jets 14. Controller 16 may then process these image data. Electronic storage 6 may store the result as to which ink-jets 14 are inoperative 14*a* or defective 14*a*. Controller 16 may later access memory 6 to determine the inoperative 14*a* ink-jet 14 identifying data. Thus, controller 16 may detect inoperative 14*a* ink-jets 14 prior or subsequent to image data. As such, controller 16 may access memory 6 to render an image to print (e.g., build a bitmap) and identify any defective 14*a* or inoperative jets 14*a*.

Controller 80 may determine a rate of change in the levels of unprintable ink remaining in inoperative ink-jets. For example, controller 80 may determine a rate of expected ink loss of a primary color. Comparison of the expected ink loss to the actual ink loss of an ink-jet may identify inoperative ink-jets. Controller 80 may determine a rate of change in the levels of printable ink in operative ink-jets to determine inoperative ink-jets. For example, controller 80 may compare the loss of ink in operative ink-jets to inoperative jets to determine which jets are inoperative. Controller 80 may use threshold values, rates, or metrics to determine inoperative ink-jets. Controller 80 may base the threshold values on the expected rate of loss for a composite color or primary color. Controller 80 may determine the average of all ink-jets to determine a threshold for inoperative ink-jets (e.g., wherein the threshold value is some percentage of the average).

Controller 80 may evaluate post-halftone IJC. In some embodiments, controller 80 may review levels of remaining ink unprintable due to inoperative ink-jets to evaluate the post-contone or post-halftone IJC. For example, post-render if optical sensor 98 determines an inadquate primary color compensation in a composite color (e.g., either in contone or halftone) IJC may be applied post-render. In some embodiments, IJC may apply pre and post render to ensure proper composite coloration and hue.

FIG. 3 represents one of typically four N-column by M-row output color-planes, which together comprise a printer frame buffer or output resolution color bitmap. Three missing rasters corresponding to a single inoperative jet are depicted at columns 7, 17 and 27. This emulates a page printer using 10-jet interlace where each jet is responsible for marking three rasters. This matches the 35×18 pixel bitmap fragments represented in FIGS. 4 to 13 and is comparable to the 10-jet interlace used to print output depicted in micrograph FIGS. 14 to 25 which only differ in the number of rasters each jet is responsible for. In the micrograph depicted print mode, each jet is responsible for six rasters. The three missing rasters correspond to three non-overlapping ten-column missing raster swaths: 310, 320 and 330. Each of these swaths is processed by IJC independently. Reference 302 identifies the pixel columns that are not modified by IJC in this single inoperable jet example. Unmodified rasters outside the modified swaths include columns 0 to 2 and 32 to N−1. Within the missing raster swaths, the missing rasters are 316: column 7, 326: column 17 and 336: column 27. Working "neighbor" columns 314 in swath 310 may be modified to compensate for missing raster 316 (raster 7). This processing may be independent of similar processing done in the other two swaths 320 and 330. Neighbor columns in swath 320 are labeled 324 and 334 in swath 330. Columns identified in FIG. 3 correspond to columns in FIGS. 4 to 13. FIGS. 3 through 13 assume one inoperative jet responsible for three missing raster columns 7, 17 and 27. The other 27 working columns 2 to 31 inclusive represent columns modified to increase image density to compensate for density lost from the three missing columns.

If the bitmap is continuous tone, pixel values are commonly 8-bits per color channel or 32-bits per pixel to represent four primary colors. If the output device expects bi-level, often called binary, valued pixels the bitmap may be halftoned to binary representing pixel values as 1-bit per output color channel or 4-bits per pixel to represent four primary colors. In this exemplary embodiment of the disclosure, a 10-jet interlace with three drum revolutions required to fill the page is assumed. In this configuration each non-edge jet in the output color plane must eject ink to three rasters marking one raster per drum revolution per jet.

As an example, assuming FIG. 3 represents cyan (C) in a typical four output color-planes representing cyan, magenta, yellow and black ink and assuming no other overlapping missing rasters or missing raster swaths in corresponding raster columns in the other three color-planes, if the IJC process is applied only to the depicted color C inkjet, color C will generally be reduced in columns 7, 17 and 27 and correspondingly increased in surrounding swath columns so that overall swath density is conserved and matches unprocessed density. IJC is only successful if color C in columns 7, 17 and 27 is reduced to predetermined negligible levels. If required image density in the neighborhood of missing rasters is greater than the maximum correctable density, IJC will generally fail to reach the required negligible levels of residual ink in the missing columns. To avoid re-rendering the page when IJC fails, IJC processing conserves primary color image density throughout the process so that when residual ink in missing rasters is printed with modified neighbor's total density is conserved.

In some cases when C is missing from composite colors, by applying the IJC process, as done in prior art, only to color C, even when predetermined negligible ink levels are achieved in the missing rasters, resulting dot profile differences between compensated and uncompensated color-planes result in ink spread overlap and mixing differences that can cause unintended artifacts primarily due to apparent hue variations even when ink population is conserved. If instead, IJC is also applied to corresponding raster swaths in working color-planes, dot profiles in modified composite colors remain relatively the same tending to conserve hue as well as density. Further, since density is conserved within each primary color over the swath, when printed normally residual ink in IJC processed working rasters 7, 17 and 27 continue to accurately contribute to intended image density, even in excess of the maximum IJC correctable density, with no additional processing needed.

FIGS. 4 to 13 depict a 35×18 pixel bitmap region (e.g., printed with the 10-jet interlace in FIG. 3) including columns number 0 to 34 of a rendered halftoned bitmap with a single inoperative jet color plane (e.g., cyan in columns 7, 17, and 27). FIGS. 4 to 13 include uniform fields of dithered blue to generate the desired composite color. The exemplary composite color is composed of equal parts cyan and magenta. FIGS. 4 to 13 represent pairs of IJC applied only to the inoperative color-plane (e.g., only cyan) and modified IJC applied to both the inoperative color-plane and at least one additional color-plane (e.g., both cyan and magenta). FIGS. 4 to 13 are exemplary embodiments only and are discussed in further detail below.

Figure 4A:
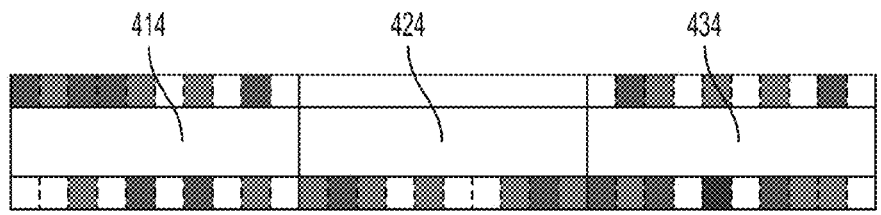
FIG. 4A illustrates the first two bitmap configurations illustrated in FIGS. 4B and 4C. They are reproduced to facilitate comparison to the actual bitmap illustrated FIG. 4B.
Figure 4B:
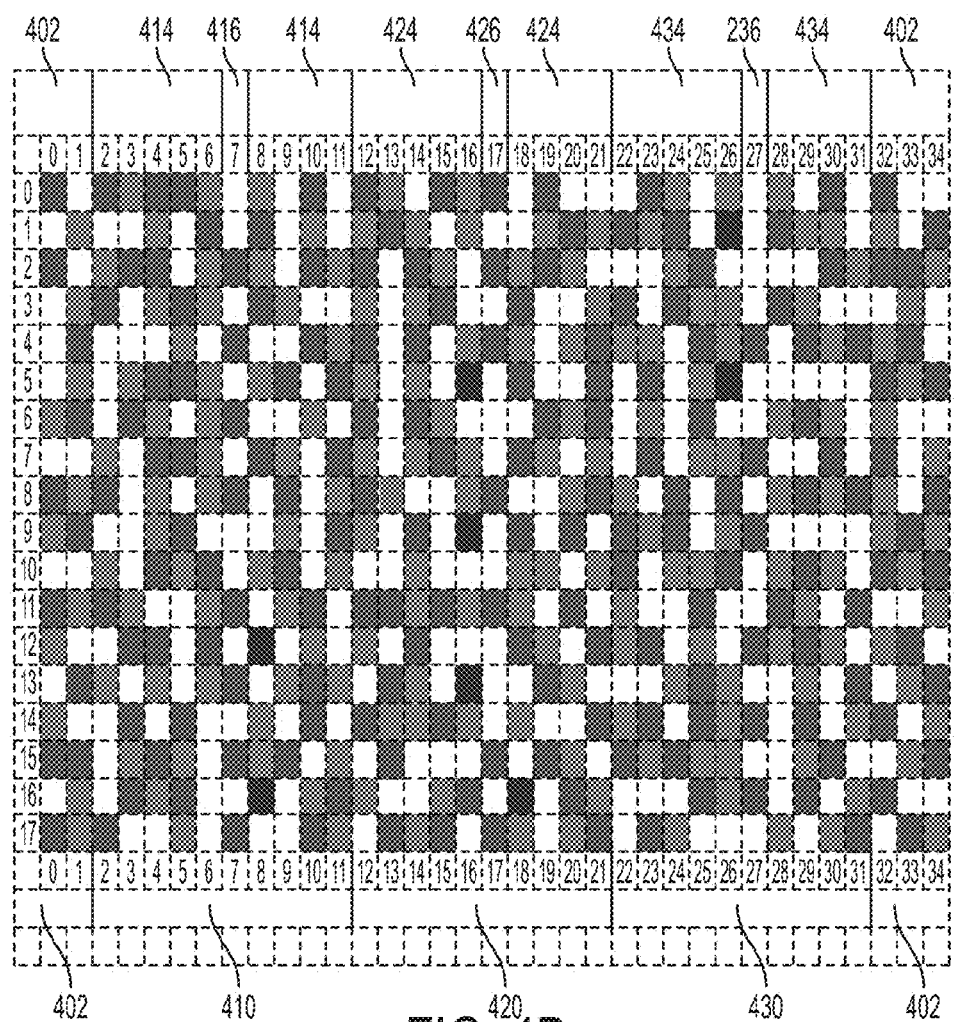
FIG. 4B depicts a 30% blue composite color obtained through IJC of the inoperative cyan ink-jet. The raster product in lines 7, 17, and 27 illustrate the composite color obtained from IJC processing the inoperative cyan ink-jet.

FIG. 4A is a compiled first and second position of the bitmaps. FIG. 4B represents four N-swath columns (e.g., including column 402) by M-rows (e.g., 308) of output color-planes 14. These raster locations comprise an output resolution color bitmap (e.g., printer frame buffer). Three raster columns 304 corresponding to a single inoperative jet 14 result in a loss of the cyan 14a color plane. Columns 416, 426, and 236 illustrate this loss as an absence of cyan 14a. This bitmap emulates a 10-jet interlace printer. In this example, each jet 14 is responsible for marking three rasters; 414, 424, and 434. This produces 35×18 pixel bitmap fragments represented in FIGS. 4 to 13. The process is analogous to 10-jet printer interlaces depicted in micrograph FIGS. 14 to 25. The only pertinent difference between FIGS. 4-13 and FIGS. 14-25, is the number of rasters 302 each jet 14 is responsible to produce. For example, FIGS. 14-25 have higher resolution because ink-jets 14 produced more pixels viewed in less detail.

FIGS. 14 to 25 illustrate exemplary color micrographs of a printed composite color output generated from a solid ink printer requiring six print passes (e.g., drum revolutions) to print a page. In this embodiment, each ink-jet prints six raster columns. For this example, the output was printed using 10-jet interlace to make the per-missing raster ink redistribution comparable to FIGS. 4 to 13.

FIGS. 14 to 17 depict dithered secondary composite colors. The composite colors are generated using equal constituent primary colors to generate uniform fields. Analogous to FIGS. 4 through 13, IJC modifications are made only to the inoperative color-plane associated with an inoperative jet. In some embodiments, IJC modifications apply to both constituent primary colors (e.g., with or without ink-jets missing). FIGS. 14-17 represent pairs of IJC applied only to the inoperative color-plane (e.g., cyan) and IJC applied to the inoperative color-plane and at least one other color plane (e.g., cyan and magenta). Specifically, FIGS. 14 to 17 illustrate a red composite color output obtained from an inoperative magenta color-plane ink-jet. FIGS. 18 to 21 illustrate a green composite color output obtained from an inoperative cyan color-plane ink-jet. FIGS. 22 to 25 illustrate a blue composite color output obtained from an inoperative cyan color-plane ink-jet. FIGS. 14 to 25 are exemplary embodiments only and are discussed in further detail below.

In some embodiments adjacent rasters in operational columns may compensate for missing raster 316. This processing may precede independent of similar processing done in adjacent swaths 320 and 330. Columns in FIG. 3 correspond to columns in FIGS. 4 to 13. For example, the print head used to print FIGS. 14 to 25 required 6 revolutions to print an approximately 8.5" wide page at 600 dots per inch so it had about 850 jets per primary color-plane or about 3400 individually addressable ink-jets simultaneously jetting. The hypothetical print head in the hypothetical three revolution 600 dpi printer described in FIGS. 4 to 13 would require approximately 6800 hypothetical jets. FIGS. 3 through 13 assume one inoperative color-plane jet 14 (e.g., in FIG. 4A cyan 14a is inoperative) responsible for the three missing raster columns 416, 426, and 236. The other 27 operative raster columns represent raster columns 304 modified to increase image density and compensate lost density from missing columns 416, 426, and 236.

If the bitmap is continuous tone, pixel values are commonly 8-bits per color channel or 32-bits per pixel to represent four primary colors. For example, 8-bit encoding may correspond to halftone (e.g., 2 layers of encoding for each of four colors) and 32-bit may correspond to contone encoding (e.g., 8 layers of encoding for each of four colors). If, as is also typical, the output device expects bi-level, often called binary, valued pixels the bitmap may be halftoned to binary representing pixel values as 1-bit per output color channel or 4-bits per pixel to represent four primary colors. In this exemplary embodiment of the disclosure, a 10-jet interlace with three drum revolutions required to fill the page is assumed. In this configuration each non-edge jet in the output color-plane must eject ink to three rasters marking one raster per drum revolution per jet.

As an example, assuming FIG. 4B represents a typical four output color-planes (e.g., cyan, magenta, yellow and black) and further assuming no other overlapping missing rasters or missing raster swaths corresponding to raster columns in other color-planes, IJC may be applied to the inoperative color-plane 14a (e.g., cyan 14a). IJC applied only to the inoperative cyan color ink-jet may generally reduce the concentration of cyan in columns 416, 426, and 236. Correspondingly, this reduction may result in increased cyan 14a concentrations in surrounding raster columns to conserve overall swath 306 concentration. IJC's success may depend on whether cyan 14a in adjacent raster columns (e.g., adjacent to 416, 426, and 236) is reduced to predetermined negligible levels. Overconcentration of the missing color plane in adjacent raster columns may fail the IJC process. Moreover, if cyan 14a concentration exceeds the maximum correctable density in adjacent raster columns, IJC may fail to reach the required levels of residual ink in the missing columns. To avoid re-rendering the page when IJC fails, IJC processing conserves primary color image density throughout the process. This enables conservation of the adjacent cells and the total density concentrations while printing missing rasters in adjacent cells and residual ink in the missing rasters.

Applying the IJC process only to the missing color (e.g., cyan), may result in dot profile difference between color-planes. Despite achieving predetermined negligible ink levels in the missing rasters dot profile differences may result. Compensated and uncompensated color-planes may result in ink spread overlap or mixing differences that cause unintended artifacts. This is particularly true of apparent hue variations and despite conserved ink proportions. However, IJC applied to corresponding raster swaths in working color-planes may maintain dot profiles in modified composite colors. The resulting composite colors remain relatively unchanged and tend to conserve hue and density. Further, since density is conserved accurate contribution results in intended image density. For example, each primary color over the swath, when printed normally residual ink in IJC processed working rasters 416, 426, and 236 may continue to accurately contribute to the intended image density. This is true even in excess of the maximum IJC correctable density. Moreover, this benefit comes with no additional processing costs.

Figure 5:
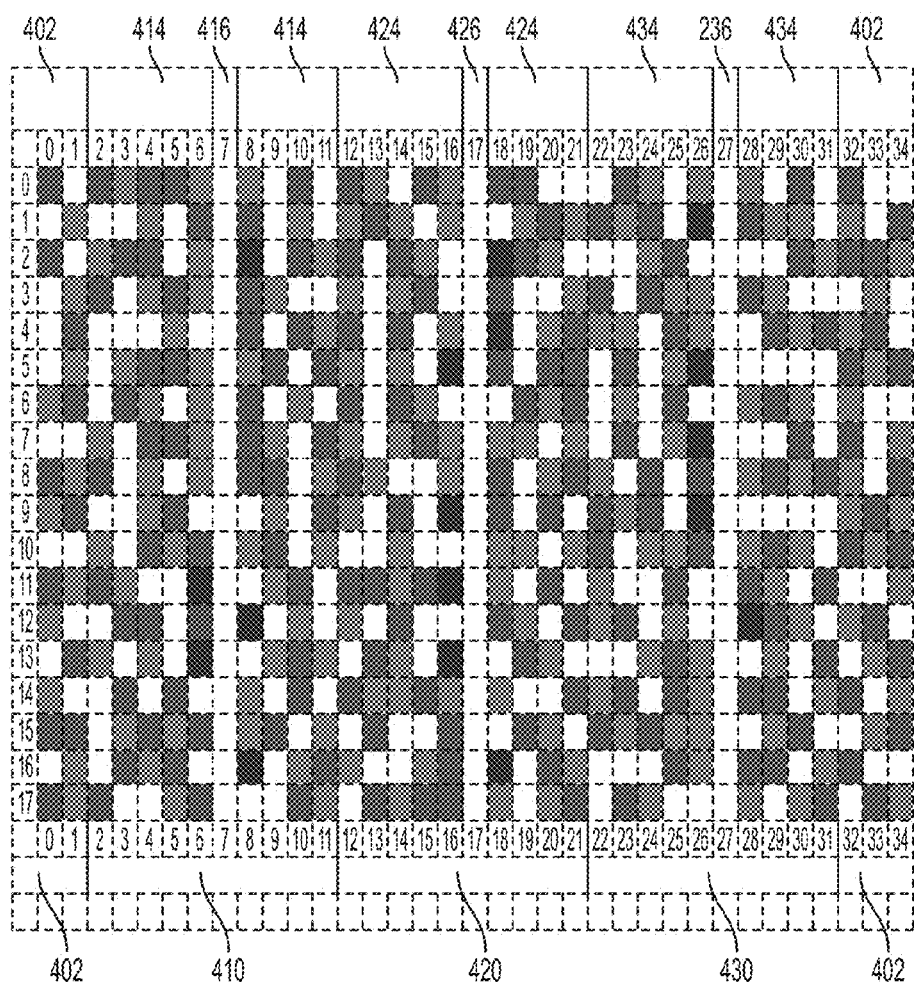
FIG. 5 depicts a 30% blue composite color obtained through modified IJC of operative and inoperative ink-jets. The raster product in lines 7, 17, and 27 illustrate the composite color obtained from modified IJC processing of both cyan (inoperative) and magenta (operative) ink-jets.
Figure 6:
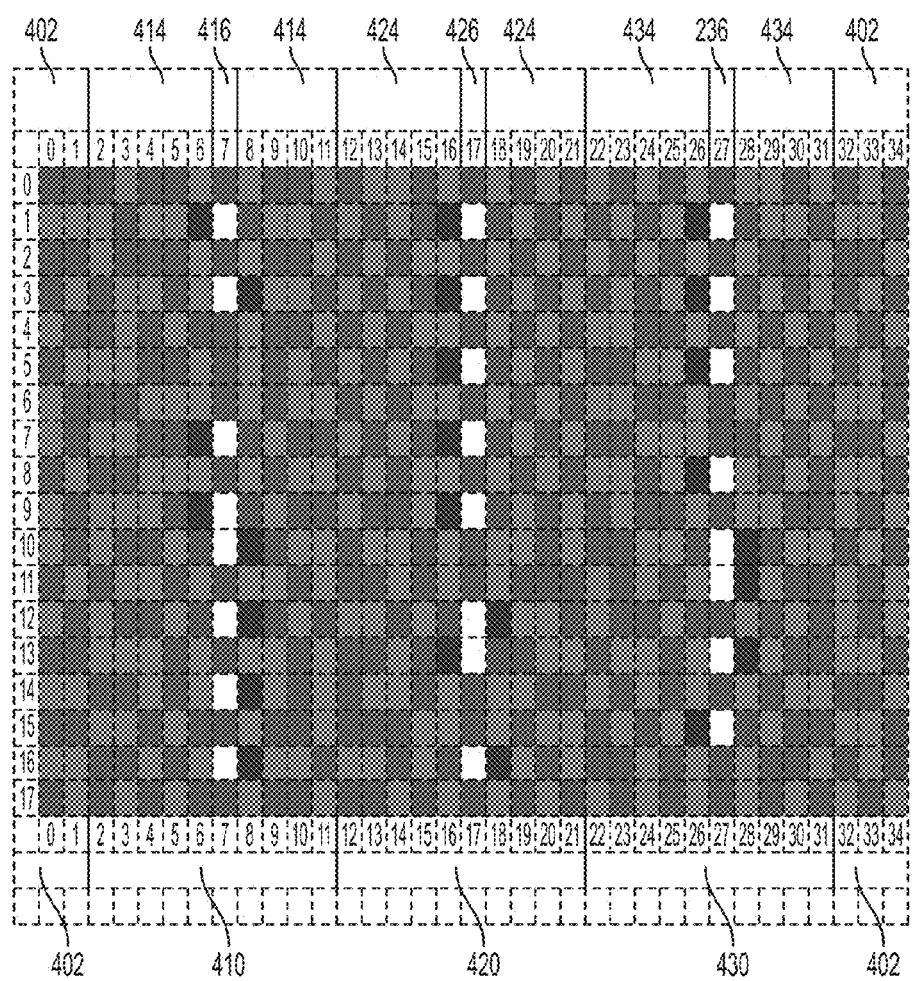
FIG. 6 depicts a 50% blue composite color obtained through IJC of the inoperative cyan ink-jet. The raster column products in lines 7, 17, and 27 illustrate the composite color obtained from IJC processing the inoperative cyan ink-jet.
Figure 7:
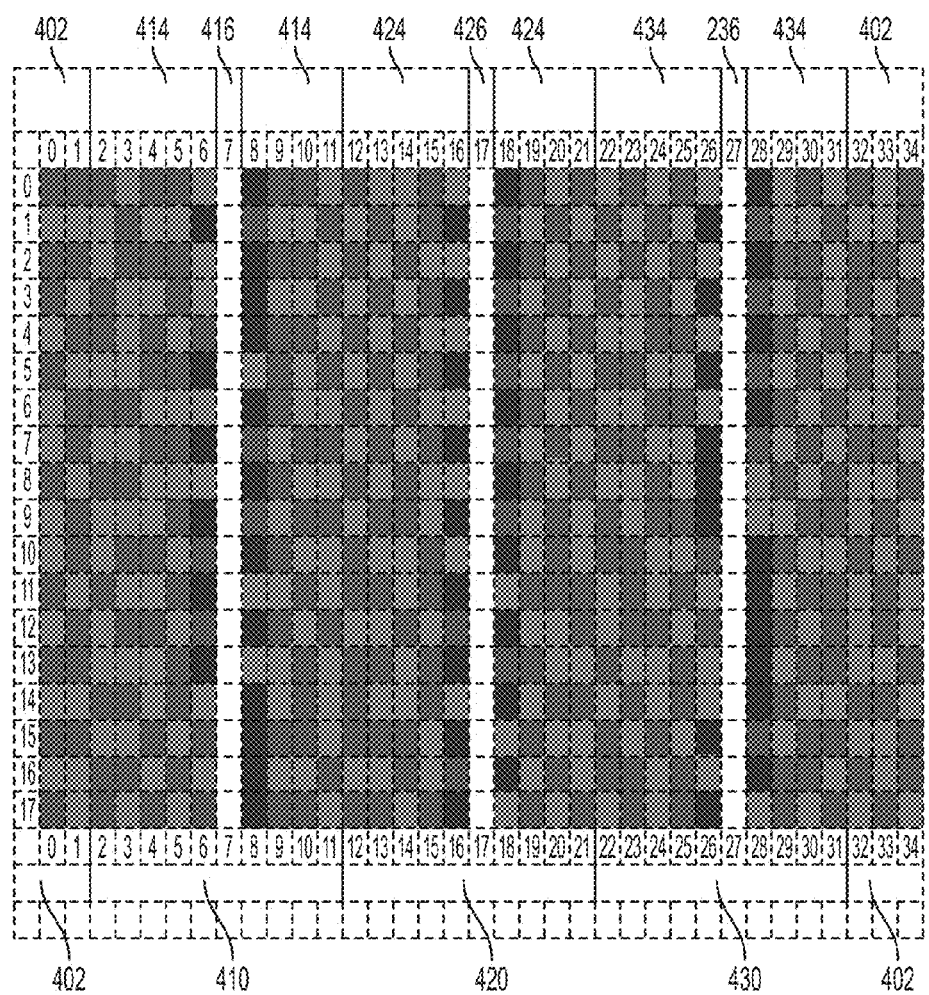
FIG. 7 depicts a 50% blue composite color obtained through modified IJC of operative and inoperative ink-jets. The products in lines 7, 17, and 27 illustrate the composite color obtained from modified IJC processing of both cyan (inoperative) and magenta (operative) ink-jets.
Figure 8:
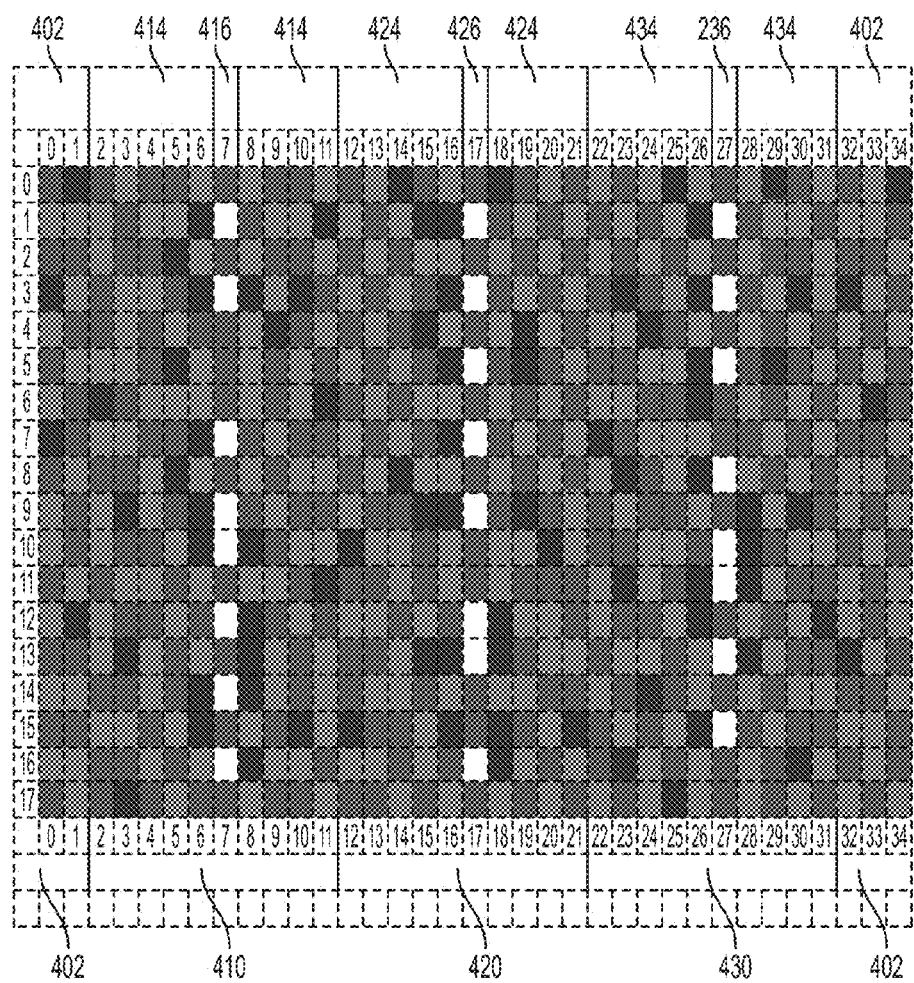
FIG. 8 depicts a 55% blue composite color obtained through IJC of the inoperative cyan ink-jet. The raster column products in lines 7, 17, and 27 illustrate the composite color obtained from IJC processing the inoperative cyan ink-jet.
Figure 9:
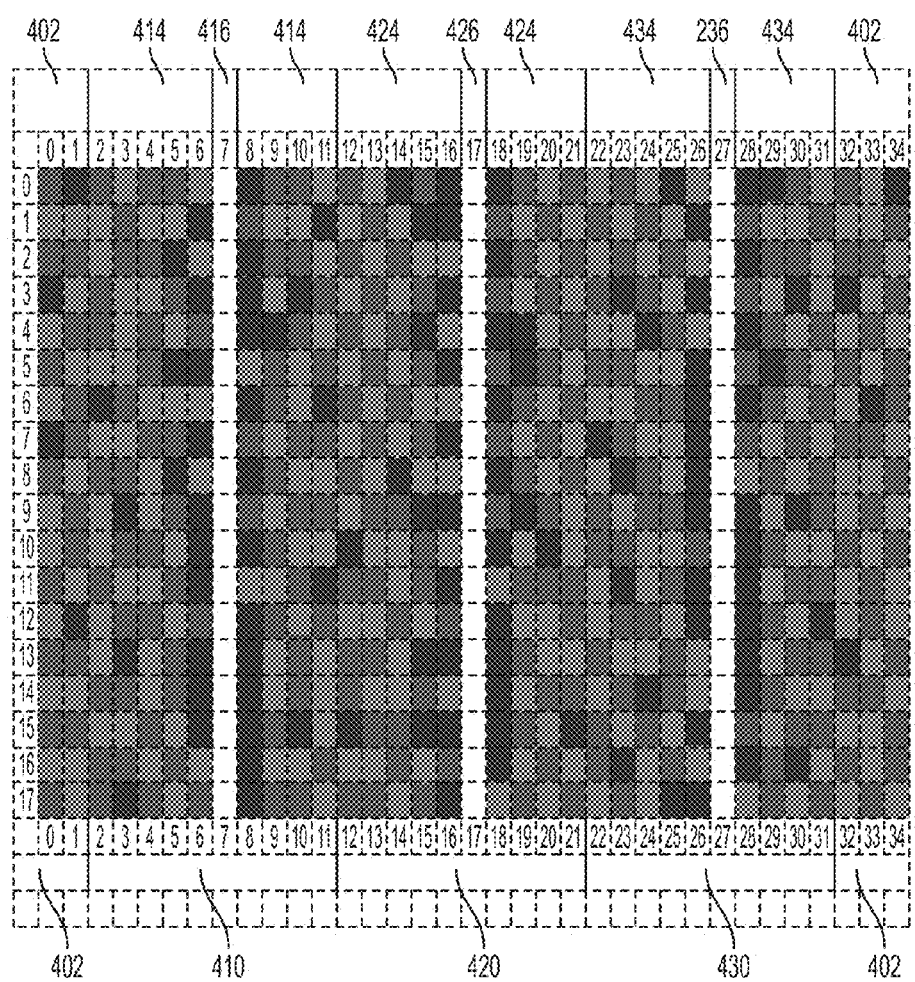
FIG. 9 depicts a 55% blue composite color obtained through modified IJC of operative and inoperative ink-jets. The products in lines 7, 17, and 27 illustrate the composite color obtained from modified IJC processing of both cyan (inoperative) and magenta (operative) ink-jets.
Figure 10:
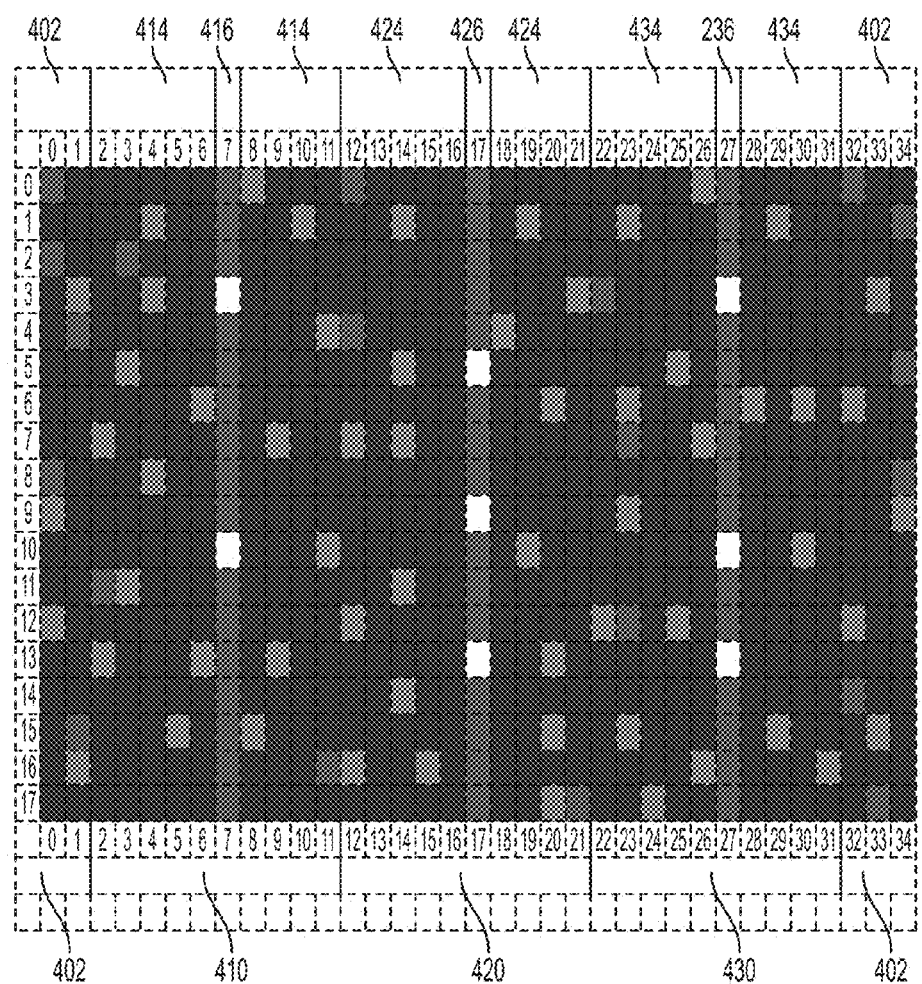
FIG. 10 depicts an 89% blue composite color obtained through IJC of the inoperative cyan ink-jet. The raster column products in lines 7, 17, and 27 illustrate the composite color obtained from IJC processing the inoperative cyan ink-jet.
Figure 11:
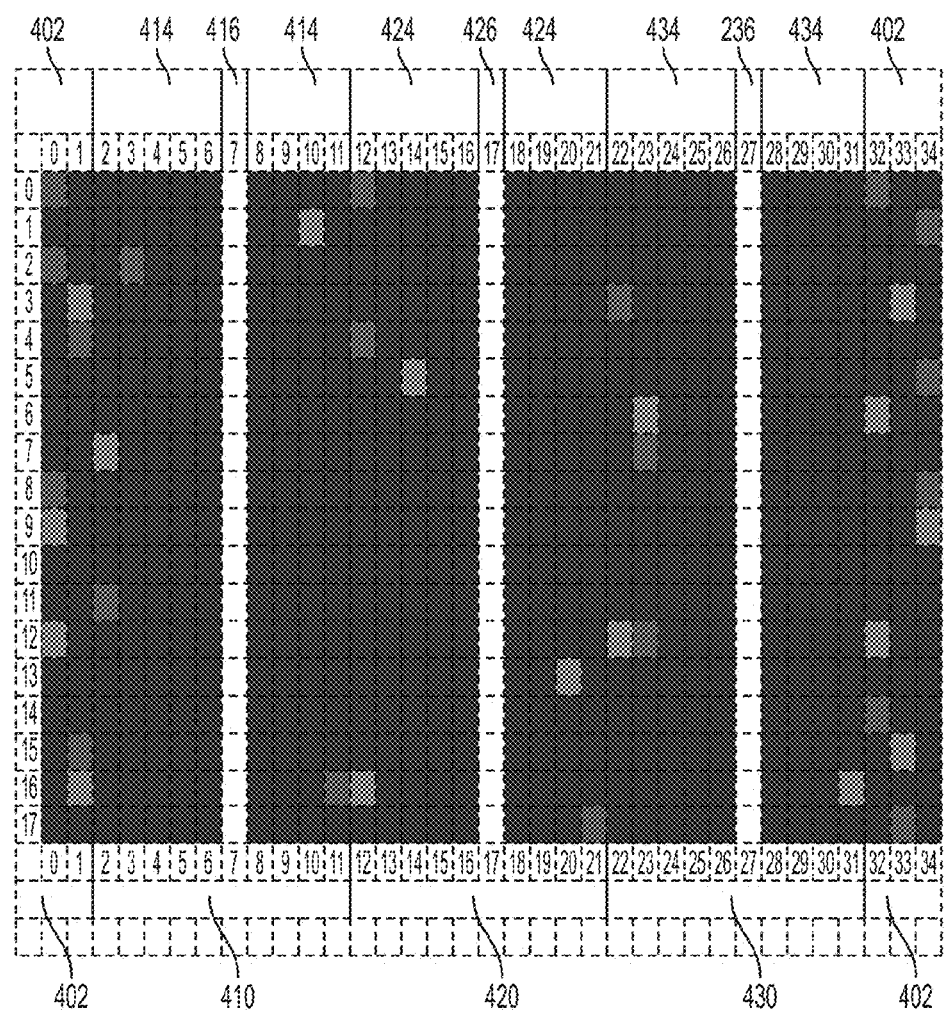
FIG. 11 depicts an 89% blue composite color obtained through modified IJC of operative and inoperative ink-jets. The products in lines 7, 17, and 27 illustrate the composite color obtained from modified IJC processing of both cyan (inoperative) and magenta (operative) ink-jets.
Figure 12:
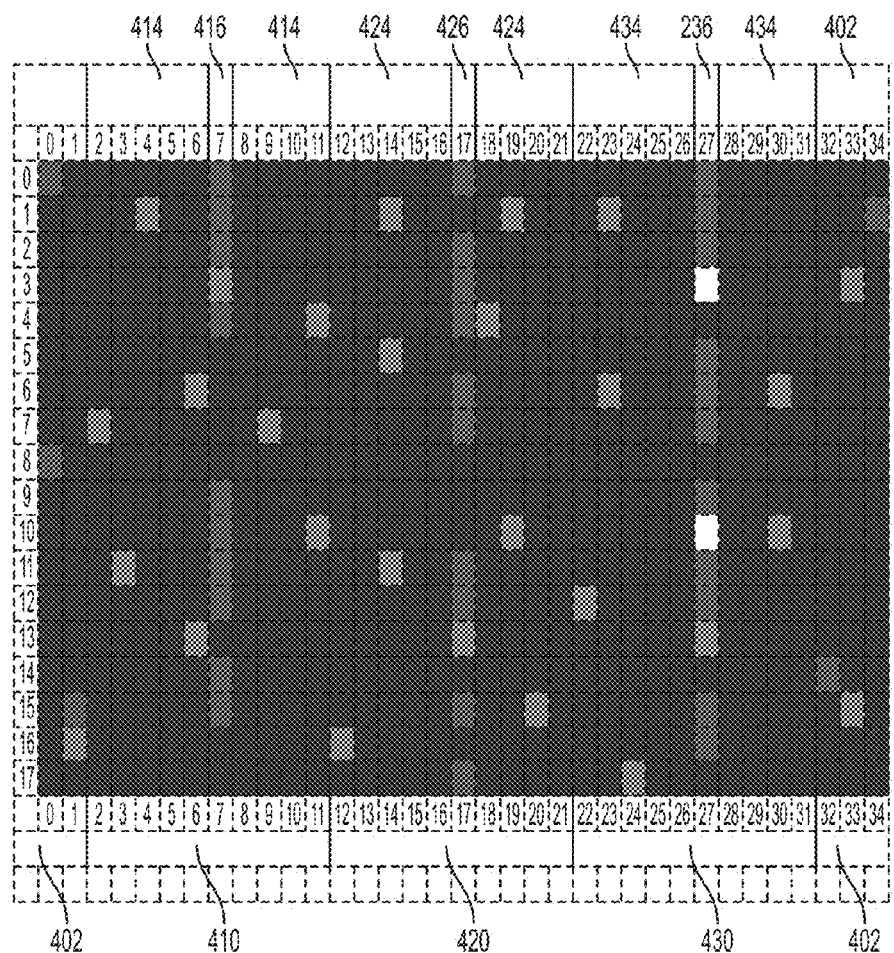
FIG. 12 depicts a 95% blue composite color obtained through IJC of the inoperative cyan ink-jet. The raster column products in lines 7, 17, and 27 illustrate the composite color obtained from IJC processing the inoperative cyan ink-jet.
Figure 13:
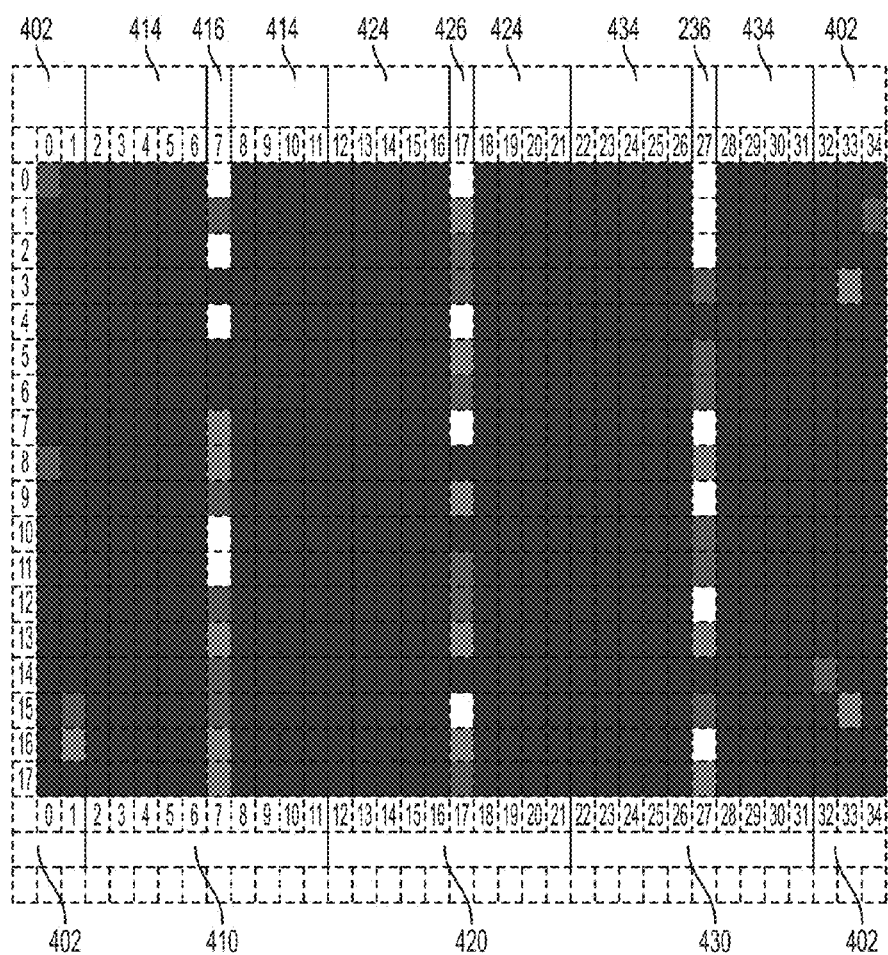
FIG. 13 depicts a 95% blue composite color obtained through modified IJC of operative and inoperative ink-jets. The products in lines 7, 17, and 27 illustrate the composite color obtained from modified IJC processing of both cyan (inoperative) and magenta (operative) ink-jets.

FIGS. 4 to 13 depict a 35×18 pixel region of a rendered and IJC post-processed bitmap containing one missing cyan jet. The 35×18 pixel region depicted in these figures corresponds to the diagram of FIGS. 4A and 4B. FIGS. 4 to 13 represent uniform fields of dithered blue composed of equal parts cyan and magenta. The exemplary embodiment may represent any pair of primary output colors forming a secondary color. Columns 416, 426, and 236 in each figure correspond to the missing inoperative cyan jet. FIGS. 4 and 5 depict a 30% composite blue color; FIGS. 6 and 7 depict a 50% composite blue color; FIGS. 8 and 9 depict a 55% composite blue color; FIGS. 10 and 11 depict an 89% composite blue color; and FIGS. 12 and 13 depict a 95% composite blue color. Raster columns 2 to 31 contain three raster swaths (reference numbers 410, 420, and 430). Each raster swath comprises a column with an inoperative cyan 14a jet (reference raster columns 416, 426, and 236 corresponding to swath columns 7, 17, and 27). The IJC process may modify one or more rasters. The IJC process does not modify raster columns 0, 1, 32, 33, and 34 (columns in swath number 402). FIGS. 4, 6, 8, 10, and 12 represent an IJC process applied only to the missing color (e.g., cyan 14a). FIGS. 5, 7, 9, 11, and 13 apply the modified IJC process to both the missing cyan 14a raster 302 (e.g., the missing color corresponding to operative and inoperative ink-jets within swath raster groups 410, 420 and 430).

FIGS. 5, 7, 9, 11 and 13 represent the modified IJC process applied to missing cyan raster swaths and to at least one corresponding non-cyan raster swath (e.g., both the cyan and magenta rasters within swath raster groups 410, 420 and 430). As discussed previously, other color rasters may apply the modified IJC process. Adjacent raster columns, for example, significantly correspond to the missing color raster concentration. For example, printing more colors for the composite color up to a maximum concentration of the missing color. This example uses 10-jet interlace. The maximum swath width is 10 columns for 10-jet interlace. Therefore, the theoretical maximum IJC correctable fractional coverage is 90%.

FIGS. 6, 8, and 10, the IJC process may successfully redistribute orphaned cyan ink (reference numbers 416, 426, and 236 of raster columns 7, 17, and 27). In some embodiments, the adjacent swath columns redistribute of cyan within the neighboring swath columns (reference numbers 414, 424, and 434 of raster columns 2-6, 8-16, 18-26, and 28-31). In some embodiments, IJC may only distribute to immediately adjacent raster columns, however, IJC may distribute to any raster column in the swath. Inoperative ink-jet 14a results in no cyan ink in columns 416, 426, and 236. (The reference numbers 416, 426, and 236 in each of FIGS. 4 to 13 identify raster columns 7, 17, and 27 missing cyan.) However, the magenta 14b ink-jet is operative.

Since magenta 14b is not missing, IJC does not process the magenta plane 14b. Therefore, missing raster columns 7, 17, and 27 (corresponding to reference number 414, 426, and 236) contain magenta only. FIG. 12 is a composite color comprising 95% blue. This concentration exceeds the IJC maximum level. Therefore, the IJC process cannot correct this level of composite blue concentration. As such, adjacent ink-jets may attempt to deflect some cyan into columns 416, 426, and 236.

Adjacent ink-jets 14 may provide a larger volume of cyan 14a ink to offset the missing cyan 14a in the adjacent raster column. However, magenta still predominates. Magenta ink-jets remain operational. Therefore, magenta is prominent in the missing cyan column "gap." Color-mixing and volume differences due to deficient cyan attempt to minimize artifacts and hue differences (e.g., ink spread). However, the proportion of magenta dot profiles may overwhelm these techniques. Magenta dot profiles within modified swaths may increase artifacts and hue differences between IJC processed (reference numbers 410, 420 and 430, column numbers 2-31) and IJC unprocessed raster columns (reference number 402, column numbers 0-1, and 32-34). High ink concentrations and coverage may exacerbate these artifacts.

IJC methods attempt to reduce maximum correctable levels in high ink concentration areas to avoid distorting the image or hue. Pre-halftone, per-raster contone, ink deflection, or ink volume color corrections may reduce some hue differences. However, these counter measures may add significant complexity, slow down printing, or diverge from the uncompensated color. Differences from instrument to instrument over the products life exacerbate these deficiencies.

In the embodiment of the current disclosure depicted in FIGS. 5, 7, 9, 11 and 13, the modified IJC process applies to both missing cyan and coincident working magenta in the raster. Applying the modified IJC process to non-working and working colors in the raster normalizes cyan and magenta dot profiles, reduces artifacts, and better preserves hue of the overall image. Applying the modified IJC process to non-working and working colors in the raster tends to empty missing column gaps in composite colors and allows better ink spread into these gaps increasing maximum correctable levels.

FIGS. 14 through 25 compare IJC color micrographs to modified IJC color micrographs (e.g., printer output). The modified IJC process applies IJC to both non-working and working colors (e.g., inoperative and operative ink-jets). FIGS. 14 through 25 use 10-jet interlace and IJC processing analogous to the process in FIGS. 4 to 13. The color micrographs differ in that they require six swaths or drum passes to fill the page rather than three used in FIGS. 3 to 13. As such, each inoperable jet corresponds to six rather than three missing raster columns. However, relevant processing and results of each modified raster in FIGS. 14-25 directly relates to FIGS. 4-13.

FIGS. 14-17 illustrate printer output for a red composite color. The missing color is magenta 14b. FIGS. 18-21 illustrate printer output for a green composite color. The missing color is cyan 14a. FIGS. 22-25 illustrate printer output for a blue composite color. The inoperable color is cyan.

Figure 14:
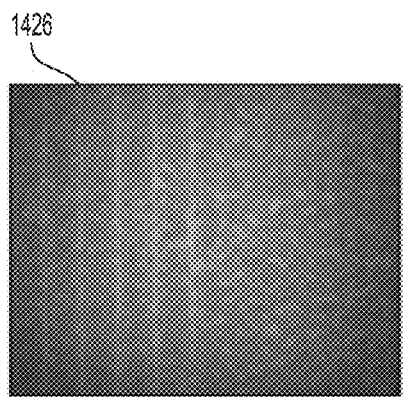
FIG. 14 depicts an 80% red composite color obtained through IJC of the inoperative magenta ink-jet. The raster column products in lines 7, 17, and 27 illustrate the composite color obtained from IJC processing the inoperative ink-jet.
Figure 16:
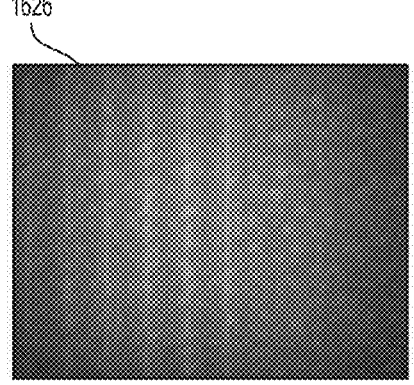
FIG. 16 depicts an 88% red composite color obtained through IJC of the inoperative magenta ink-jet. The raster column products in lines 7, 17, and 27 illustrate the composite color obtained from IJC processing the inoperative ink-jet.

FIGS. 14, 16, 18, 20, and 22 correspond to an IJC process applied only to the missing color in the raster column. In color micrograph, missing colors in raster columns appear as vertical streaks. For example, FIG. 14 illustrates an 80% red composite color. FIG. 16 illustrates an 88% red composite color. FIGS. 14 and 16 have vertical yellow streaks in the process direction. Vertical columns 1426 and 1526 appear yellow in the red composite color corresponding to the inoperative magenta 14b ink-jet 14.

Figure 18:
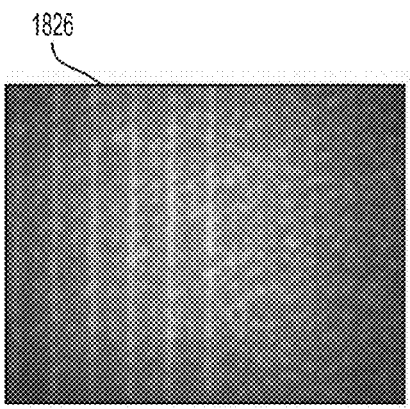
FIG. 18 depicts an 80% green composite color obtained through IJC of the inoperative cyan ink-jet. The raster column products in lines 7, 17, and 27 illustrate the composite color obtained from IJC processing the adjacent ink-jet as inoperative in the cyan color-plane.
Figure 19:
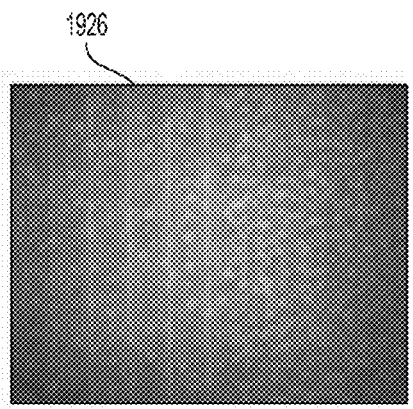
FIG. 19 depicts an 80% green composite color obtained through modified IJC of operative and inoperative ink-jets. The products in lines 7, 17, and 27 illustrate the composite color obtained from modified IJC processing of both cyan (inoperative) and yellow (operative) ink-jets.
Figure 20:
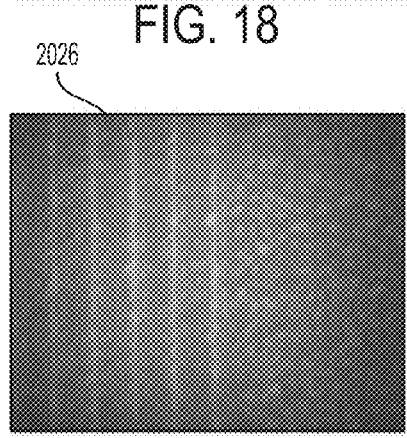
FIG. 20 depicts an 88% green composite color obtained through IJC of the inoperative cyan ink-jet. The raster column products in lines 7, 17, and 27 illustrate the composite color obtained from IJC processing the inoperative ink-jet.
Figure 21:
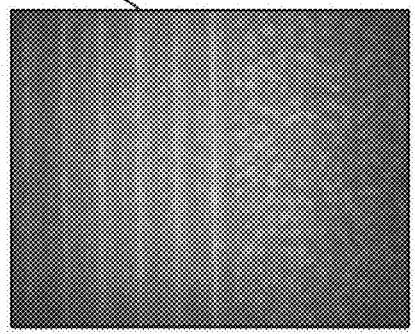
FIG. 21 depicts an 88% green composite color obtained through modified IJC of operative and inoperative ink-jets. The products in lines 7, 17, and 27 illustrate the composite color obtained from modified IJC processing of both cyan (inoperative) and yellow (operative) ink-jets.

FIGS. 18 and 20 apply IJC only to the missing cyan 14a color in the composite green raster column 304. FIG. 18 illustrates an 80% green composite color; FIG. 20 illustrates an 88% green composite color. FIGS. 18 and 20, include a vertical yellow streak. For example, columns 1826 and 2026 appear yellow corresponding to the inoperative cyan 14a ink-jet 14.

Figure 22:
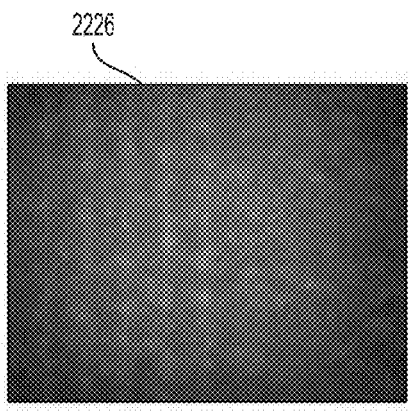
FIG. 22 depicts an 80% blue composite color obtained through IJC of the inoperative cyan ink-jet. The raster column products in lines 7, 17, and 27 illustrate the composite color obtained from IJC processing the inoperative ink-jet.
Figure 24:
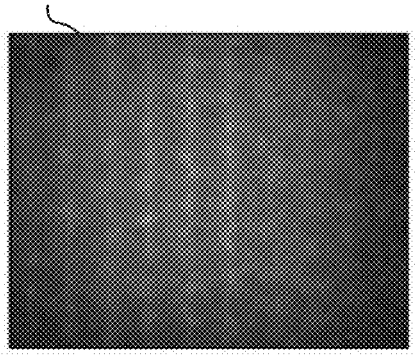
FIG. 24 depicts an 88% blue composite color obtained through IJC of the inoperative cyan ink-jet. The raster column products in lines 7, 17, and 27 illustrate the composite color obtained from IJC processing the inoperative ink-jet.

(94) FIGS. 22 and 24 apply IJC only to the missing cyan 14a color in the composite blue raster column 304. FIG. 22 illustrates an 80% blue composite color and FIG. 24 illustrates an 88% blue composite color. FIGS. 22 and 24 comprise a vertical magenta streak. For example, columns 2226 and 2426 have a magenta coloration corresponding to the inoperative cyan 14a ink-jet 14.

Figure 15:
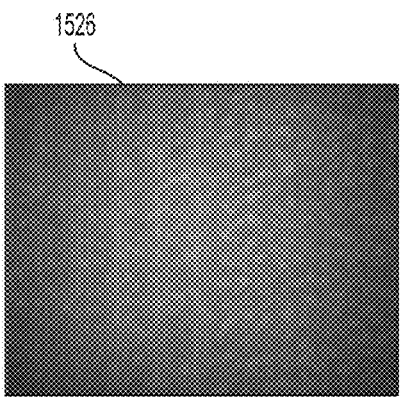
FIG. 15 depicts an 80% red composite color obtained through modified IJC of operative and inoperative ink-jets. The products in lines 7, 17, and 27 illustrate the composite color obtained from modified IJC processing of both magenta (inoperative) and yellow (operative) ink-jets.
Figure 17:
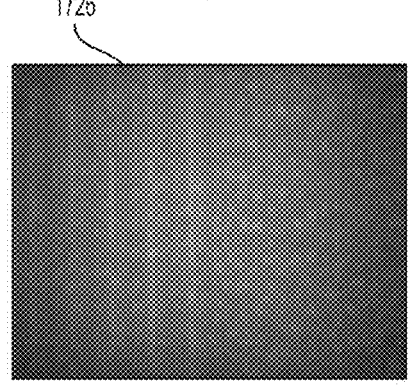
FIG. 17 depicts an 88% red composite color obtained through modified IJC of operative and inoperative ink-jets. The products in lines 7, 17, and 27 illustrate the composite color obtained from modified IJC processing of both magenta (inoperative) and yellow (operative) ink-jets.

FIGS. 15, 17, 19, 21, 23, and 25 demonstrate benefits of applying the modified IJC process to inoperative 14a and operative 14b ink-jet 14 colors 14a-d in the raster columns 304 or the swath 310. More specifically, FIGS. 15 and 17 illustrate a red composite color printed with an inoperative cyan 14a ink-jet to demonstrate the benefits of modified IJC. For example, FIGS. 15 and 17 streaks (1526 and 1726) obtained with modified IJC methods compare favorably to FIGS. 14 and 16 streaks (1426 and 1626).

Figure 23:
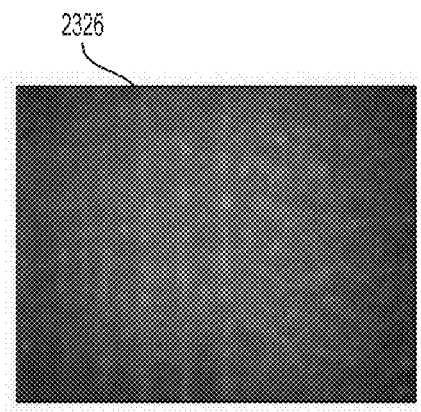
FIG. 23 depicts an 80% blue composite color obtained through modified IJC of operative and inoperative ink-jets. The products in lines 7, 17, and 27 illustrate the composite color obtained from modified IJC processing of both cyan (inoperative) and magenta (operative) ink-jets.
Figure 25:
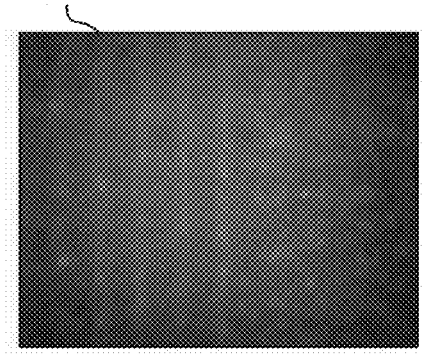
FIG. 25 depicts an 88% blue composite color obtained through modified IJC of operative and inoperative ink-jets. The products in lines 7, 17, and 27 illustrate the composite color obtained from modified IJC processing of both cyan (inoperative) and magenta (operative) ink-jets.

FIGS. 23 and 25 illustrate a blue composite color printed with an inoperative cyan 14a ink-jet 14 in the swath 310. FIGS. 23 and 25 demonstrate the benefit of modified IJC processes. The modified IJC process applied to both cyan missing raster columns and working magenta columns and results in equalized hue differences between modified and unmodified areas. Modified IJC processing reduces artifacts. The magenta vertical streaks impact the overall hue and density of the printed image. For example, FIGS. 23 and 25 streaks (2326 and 2526) obtained with modified IJC compare favorable to FIGS. 22 and 24 streaks (2226 and 2426).

FIGS. 15, 17, 19, 21, 23, and 25 clearly indicate that the modified IJC process improves the hue, color density, and imaging characteristics of missing and adjacent raster locations. The resulting images have a more uniform color density and minimized streaks and equalized hue differences.

Modified IJC may permit ink from the neighboring pixel columns (rasters) in the swath to spread into the missing raster gaps more uniformly and completely. Modified IJC may result in desirable ink spreading. Modified IJC applied to both primary colors and adjacent colors may reduce deviation from the intended color. Increased consistency over the printer's life results due to reduced color divergence. Quality controls of primary colors and printer to printer color variations significantly reduce color divergences. The process may result in improved color consistency over products life.

Ink spreading processes attempt to spread the ink in the printed image. Added volume, deflected adjacent ink-jets, and physical spreading are processes to obtain ink penetration of the missing color missing raster or missing raster gap. For example, physical spreading may spread ink between two rollers (e.g., with a nip). The ink drops may expand into a missing raster or gap. Increased ink drop volumes may result or enhance in such spreading. Attempts to deflect ink from an adjacent operative ink-jet into the missing gap attempts to improve ink penetration in a missing color.

Ink drop spreading processes include expanding ink penetration in gaps from adjacent ink-jets. Ink drop spreading may include deflecting missing ink drops, physically spreading emitted ink drops, emitting more voluminous missing ink drops in adjacent ink-jets (e.g., contone or half-toning), and or other methods to penetrate the gap with missing ink. These processes attempt to fill the missing raster gap with compensated missing ink.

Neighboring dot gain effect tends to move adjacent jetted ink portions of the composite color into a gap corresponding to the defective ink-jet. To obtain the effect, the adjacent ink should be ejected close enough to the area where the inoperative ink-jet would eject ink. Mixing primary colors enhances the dot gain effect. Consequently, controller 16 may implement ejecting other color ink drops from adjacent ink-jets. For example, controller 16 may eject a first color and a second color at a distance from the missing pixel location into which the inoperative ink-jet failed to eject at least one ink drop color corresponding to the desired composite color.

Intermediate printing process may obtain the dot gain effect prior to encountering the nip forcing the ink into the gap. The ink mass may move on the release agent layer. Some dot gain effect may occur prior to the transfix roller nip where mechanical pressure furthers the dot gain effect. Coincident ink drops ejected from the same print head appear to facilitate movement of ink on the release agent layer. Coincident ink drops may increase the volume of ink on the release agent layer and therefore increase ink penetration. Moreover, coincident ink drops may facilitate an attenuated perceptibility of ink color. In some embodiments, the same print-head ink-jet ejects coincident ink drops that land on or near previously ejected ink drops. The previously ejected ink drops may share a common column with the coincident ink drops. The arraignment facilitates coalescence or mixing of different ink drops prior to solidification (e.g., coincident ink and previously ejected ink). The inks may have different colors. Well mixed ink drops coalesce into heavier composite column strings and tend to move and spread into adjacent columns of composite colors. As such, mixed ink drops may more efficiently push the adjacent ink columns of composite colors into the missing gap from the inoperable jet 14.

The methods disclosed herein may be implemented by a processor configured with instructions and related circuitry to perform the methods. Accordingly, storing such instructions on computer readable media 6 within printer 10 shown in FIG. 1 may configure one or more controllers 16 of the system to perform the methods described.

In some embodiments only one check for IJC success is performed post-halftone. For example, post-halftone IJC may fail because the combined pre and post halftone IJC failed. In other words, even with the benefit of pre-halftone (contone domain) IJC inoperative jet compensation may fail. Pre-halftone IJC may work to provide the residual orphaned ink. In some embodiments, post halftone (binary) IJC may successfully reposition pre-halftone IJC ink. Modified IJC may affect the position of operable or inoperable orphaned ink. As described above, this modified positioning may improve colorimetry or hue of the final printed composite color(s).

What is claimed is:

1. A system for maintaining colorimetry and hue in printed composite colors comprising:
   a printer configured to obtain a bitmap indicating a first color-plane and a first contone compensation for a first pixel;
   a sensor configured to generate output signals indicating a first inoperative color-plane; and
   a controller configured to control a second adjacent color-plane and contone to compensate the first inoperative color-plane and configured to compensate for at least one operative color-plane at the first pixel;
   wherein the controller controls the second adjacent color-plane to compensate the first inoperative color-plane by treating all operative and inoperative color-planes in the adjacent raster column as inoperative.

2. The system of claim 1, further comprising an optical sensor to generate output signals to the controller related to the hue of the composite color, wherein the controller is configured to evaluate or modify the second adjacent color-plane compensation.

3. The system of claim 1, wherein the controller determines a rate of change in the levels of unprintable ink remaining in inoperative ink-jets or a rate of change in the levels of printable ink in operative ink-jets to determine inoperative ink-jets.

4. The system of claim 1, wherein the printer prints at full speed.

5. The system of claim 1, wherein the controller is configured to control the second adjacent color-plane to deflect ink into the adjacent raster column to compensate the first inoperative color-plane.

6. The system of claim 1, wherein the controller is configured to control the second adjacent color-plane contone to increase a volume of ink in order to compensate the first inoperative color-plane.

7. A method for maintaining colorimetry and hue in printed composite colors comprising:
   obtaining a bitmap indicating a first color-plane and a first contone compensation for a first pixel;
   generating output signals indicating a first inoperative color-plane; and
   controlling a second adjacent color-plane and contone to compensate the first inoperative color-plane and configured to compensate for at least one operative color-plane at the first pixel;
   wherein controlling the second adjacent color-plane compensates the first inoperative color-plane by treating all operative and inoperative color-planes in the adjacent raster column as inoperative.

8. The method of claim 7, wherein the controller determines a rate of change in the levels of unprintable ink remaining in inoperative ink-jets or a rate of change in the levels of printable ink in operative ink-jets to determine which ink-jets are inoperative.

9. The method of claim 7, further comprising:
   evaluating IJC implementation by reviewing levels of remaining unprintable ink from inoperative ink-jets compared to ink remaining in working rasters processed as missing by IJC.

10. The method of claim 9, wherein successful application of IJC renders the bitmap and allows the printer to print at full speed.

11. The method of claim 7, wherein the second adjacent color-plane is controlled to deflect ink into the adjacent raster column to compensate the inoperative first color-plane.

12. A method for maintaining colorimetry and hue of printed composite colors in a halftone printing process, the method comprising:
   obtaining a bitmap indicating a first color-plane and a first pre-halftone compensation for a first pixel;
   generating output signals indicating a first inoperative color-plane; and
   controlling a second adjacent color-plane and post-halftone to compensate the first inoperative color-plane and configured to compensate for at least one operative color-plane at the first pixel;
   wherein controlling the second adjacent color-plane compensates the first inoperative color-plane by treating all operative and inoperative color-planes in the adjacent raster column as inoperative.

13. The method of operating ink-jets in a printer of claim 12, further comprising:
   evaluating the post-halftone IJC by reviewing levels of remaining ink unprintable due to inoperative ink-jets.

14. The method of claim 12, wherein if the application of the post-halftone IJC is successful, the printer prints the print job at full speed.

15. The method of claim 12, wherein if the application of the post-halftone IJC is not successful, the printer prints the print job at reduced speed.

16. The method of claim 12, further including applying the pre-halftone IJC to swaths corresponding to missing raster swaths in all other color-planes in the composite color to be printed in the columns identified as missing due to the inoperative ink-jet.

17. The method of claim 12, further including applying the post-halftone IJC to swaths corresponding to missing raster swaths in all other color-planes in the composite color to be printed in the columns identified as missing due to the inoperative ink-jet.

* * * * *